United States Patent
Hariharan et al.

(10) Patent No.: US 8,638,741 B2
(45) Date of Patent: Jan. 28, 2014

(54) RETRANSMISSION MODE SIGNALING IN A WIRELESS COMMUNICATION SYSTEM

(75) Inventors: Priya Hariharan, Dallas, TX (US); Christian Wengerter, Kleinheubach (DE)

(73) Assignee: Panasonic Corporation, Osaka (JP)

( * ) Notice: Subject to any disclaimer, the term of this patent is extended or adjusted under 35 U.S.C. 154(b) by 88 days.

(21) Appl. No.: 13/258,368

(22) PCT Filed: Feb. 2, 2010

(86) PCT No.: PCT/EP2010/000623
§ 371 (c)(1),
(2), (4) Date: Nov. 10, 2011

(87) PCT Pub. No.: WO2010/108566
PCT Pub. Date: Sep. 30, 2010

(65) Prior Publication Data
US 2012/0057545 A1    Mar. 8, 2012

(30) Foreign Application Priority Data
Mar. 23, 2009 (EP) .................................... 09004135

(51) Int. Cl.
*H04W 4/00* (2009.01)
(52) U.S. Cl.
USPC .......................................... 370/329; 370/392
(58) Field of Classification Search
None
See application file for complete search history.

(56) References Cited

U.S. PATENT DOCUMENTS

| | | | |
|---|---|---|---|
| 8,149,695 B2 * | 4/2012 | Khanna et al. | 370/230 |
| 2003/0103503 A1 * | 6/2003 | Dubuc et al. | 370/392 |
| 2005/0250511 A1 | 11/2005 | Xiao | |
| 2006/0123324 A1 * | 6/2006 | Cudak et al. | 714/776 |
| 2008/0130590 A1 * | 6/2008 | Kim et al. | 370/336 |
| 2010/0014474 A1 * | 1/2010 | Miki et al. | 370/329 |

FOREIGN PATENT DOCUMENTS

| | | |
|---|---|---|
| EP | 1 571 773 | 9/2005 |
| EP | 2 068 483 | 6/2009 |
| WO | 2008/041653 | 4/2008 |
| WO | 2008/084989 | 7/2008 |

OTHER PUBLICATIONS

International Search Report dated Jul. 9, 2010.
European Search Report dated Nov. 27, 2009.

(Continued)

*Primary Examiner* — David Oveissi
(74) *Attorney, Agent, or Firm* — Dickinson Wright PLLC

(57) ABSTRACT

The invention relates to a method for determining a retransmission mode of a retransmission protocol for data transmissions provided to a communication terminal. Furthermore, the invention relates to the operation of the communication terminal, e.g. a user equipment or relay node, to perform such method, as well as a Node B cooperating with the communication terminal. The invention is inter alia applicable to a 3GPP LTE-A system as standardized by the $3^{rd}$ Generation Partnership Project (3GPP). In order to suggest a mechanism for determining or dynamically configuring a retransmission mode of a retransmission protocol, the invention suggests a control message format that allows a dynamic signaling of the retransmission mode of a retransmission protocol. The control message is designed to comprise a field that can indicate a plurality of different codepoints. The codepoints are divided into at least two subsets, wherein the codepoints of each subset indicate a respective retransmission mode.

19 Claims, 9 Drawing Sheets

(56) References Cited

OTHER PUBLICATIONS

3GPP TR 25.913 V8.0.0, "3rd Generation Partnership Project; Technical Specification Group Radio Access Network; Requirements for Evolved UTRAN (E-UTRA) and Evolved UTRAN (E-UTRAN) (Release 8)," Dec. 2008, pp. 1-18, p. 2, Line 5.

3GPP TS 36.211 V8.6.0, "3rd Generation Partnership Project; Technical Specification Group Radio Access Network; Evolved Universal Terrestrial Radio Access (E-UTRA); Physical Channels and Modulation (Release 8)," Mar. 2009, pp. 1-83, p. 2, Line 21.

3GPP TR 36.814 V1.0.0, "3rd Generation Partnership Project; Technical Specification Group Radio Access Network; Further Advancements for E-UTRA Physical Layer Aspects (Release 9)," Feb. 2009, pp. 1-31, together with its cover sheet: 3GPP TSG RAN WG1 Meeting #56, "TR 36.814 V1.0.0 Further Advancements for E-UTRA Physical Layer Aspects," R1-091125, Feb. 9-13, 2009, p. 1, p. 9, Line 21.

3GPP TSG-RAN WG1 Meeting #56, "PDCCH coding and mapping for carrier aggregation," Panasonic, R1-090682, Feb. 9-13, 2009, pp. 1-5, p. 13, Line 9.

\* cited by examiner

| resource assignement | resource assignement |
|---|---|
| retransmission protocol related infromation | retransmission protocol related infromation |
| other | other |

Fig. 4

| resource assignement | resource assignement |
|---|---|
| retransmission protocol related infromation ||
| other | other |

Fig. 5

RETRANSMISSION MODE SIGNALING IN A WIRELESS COMMUNICATION SYSTEM

FIELD OF THE INVENTION

The invention relates to a method for determining a retransmission mode of a retransmission protocol for data transmissions provided to a communication terminal. Furthermore, the invention relates to the operation of the communication terminal, e.g. a user equipment/mobile terminal or relay node, to perform such method, as well as a Node B/base station cooperating with the communication terminal. The invention is inter alia applicable to a 3GPP LTE-A system as standardized by the $3^{rd}$ Generation Partnership Project (3GPP).

TECHNICAL BACKGROUND

3GPP Long Term Evolution (3GPP LTE)

Third-generation mobile systems (3G) based on WCDMA radio-access technology, such as UMTS (Universal Mobile Communications System), are currently deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

In order to be prepared for further increasing user demands and to be competitive against new radio access technologies 3GPP introduced a new mobile communication system which is called Long Term Evolution (LTE). LTE is designed to meet the carrier needs for high speed data and media transport as well as high capacity voice support to the next decade. The ability to provide high bit rates is a key measure for LTE. The work item (WI) specification on LTE called Evolved UMTS Terrestrial Radio Access (UTRA) and UMTS Terrestrial Radio Access Network (UTRAN) is to be finalized as Release 8 (Rel-8 LTE). The LTE system represents efficient packet-based radio access and radio access networks that provide full IP-based functionalities with low latency and low cost. The detailed system requirements are given in 3GPP TR 25.913, "Requirements for Evolved UTRA (E-UTRA) and Evolved UTRAN (E-UTRAN)," version 8.0.0, January 2009 (available at http://www.3gpp.org and incorporated herein by reference).

In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP), and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmission power of the user equipment (UE). Many key packet radio access techniques are employed including multiple-input multiple-output (MIMO) channel transmission techniques, and a highly efficient control signaling structure is achieved in Rel. 8 LTE.

General Structure for Downlink Physical Channels

The general downlink LTE baseband signal processing according to 3GPP TS 36.211, "Evolved Universal Terrestrial Radio Access (E-UTRA); Physical channels and modulation", version 8.6.0, March 2009, section 6.3 (available at http://www.3gpp.org and incorporated herein by reference) is exemplarily shown in FIG. 1. Further details on the LTE downlink can be found in 3GPP TS 36.211, section 6. A block of coded bits is first scrambled. Up to two codewords can be transmitted in one sub-frame.

In general, scrambling of coded bits helps to ensure that receiver-side decoding can fully utilize the processing gain provided by channel code. For each codeword, by applying different scrambling sequence for neighboring cells, the interfering signals are randomized, ensuring full utilization of the processing gain provided by the channel code. The scrambled bits are transformed to a block of complex modulation symbols using the data modulator for each codeword. The set of modulation schemes supported by LTE downlink includes QPSK, 16-QAM and 64-QAM corresponding to 2, 4 or 6 bits per modulation symbol.

Layer mapping and precoding are related to MIMO applications. The complex-valued modulation symbols for each of the code words to be transmitted are mapped onto one or several layers. LTE supports up to four transmit antennas. The antenna mapping can be configured in different ways to provide multi antenna schemes including transmit diversity, beam forming, and spatial multiplexing. Further the resource block mapper maps the symbols to be transmitted on each antenna to the resource elements on the set of resource blocks assigned by the scheduler for transmission. The selection of resource blocks depends on the channel quality information.

Downlink control signaling is carried out by three physical channels
- PCFICH to indicate the number of OFDM symbols used for control in a sub-frame
- PHICH which carries downlink ACK/NACK associated with UL data transmission
- PDCCH which carries downlink scheduling assignments and uplink scheduling grants.

Physical Downlink Control Channel (PDCCH) Assignment

The physical downlink control channel carries scheduling assignments. Each scheduling grant is defined based on Control Channel Elements (CCE). The CCE corresponds to a set of resource elements. In 3GPP LTE, one CCE consists of nine Resource Element Groups (REGs). One REG consists of four Resource Elements (REs).

The PDCCH is transmitted on the first one to three OFDM symbols within a sub-frame. This control channel region consists of a set of CCEs, where the total number of CCEs in the control region of sub-frame is distributed throughout time and frequency control resource. Multiple CCEs can be combined to effectively reduce the coding rate of the control channel. CCEs are combined in a predetermined manner using a tree structure to achieve different coding rate.

In 3GPP LTE, a PDCCH can aggregate 1, 2, 4 or 8 CCEs. The number of CCEs available for control channel assignment is a function of several factors, including carrier bandwidth, number of transmit antennas, number of OFDM symbols used for control and the CCE size. Multiple PDCCH can be transmitted in a sub-frame.

On a transport channel level, the information transmitted via the PDCCH is also refereed as L1/L2 control signaling. L1/L2 control signaling is transmitted on the downlink for each UE. The control signaling is commonly multiplexed with the downlink (user) data in a sub-frame (assuming that the user allocation can change from sub-frame to sub-frame). Generally, it should be noted that user allocation might also be performed on a TTI (Transmission Time Interval) basis where the TTI length is a multiple of the sub-frames. The TTI length may be fixed in a service area for all users, may be different for different users, or may even by dynamic for each user. Generally, then the L1/2 control signaling needs only be transmitted once per TTI.

Generally, the PDCCH information sent on the L1/L2 control signaling may be separated into the Shared Control Information (SCI) and Dedicated Control Information (DCI).

Shared Control Information (SCI)

Shared Control Information (SCI) carries so-called Cat 1 information. The SCI part of the L1/L2 control signaling contains information related to the resource allocation (indication). The SCI typically contains the following information:

User identity, indicating the user which is allocated
RB allocation information, indicating the resources (Resource Blocks, RBs) on which a user is allocated. Note, that the number of RBs on which a user is allocated can be dynamic.
Duration of assignment (optional) if an assignment over multiple sub-frames (or TTIs) is possible
Depending on the setup of other channels and the setup of the Dedicated Control Information (DCI), the SCI may additionally contain information such as ACK/NACK for uplink transmission, uplink scheduling information, information on the DCI (resource, MCS, etc.).

Dedicated Control Information (DCI)

Dedicated Control Information (DCI) carries the so-called Cat 2/3 information. The DCI part of the L1/L2 control signaling contains information related to the transmission format (Cat 2) of the data transmitted to a scheduled user indicated by Cat 1. Moreover, in case of application of (hybrid) ARQ it carries HARQ (Cat 3) information. The DCI needs only to be decoded by the user scheduled according to Cat 1. The DCI typically contains information on:

Cat 2: Modulation scheme, transport-block (payload) size (or coding rate), MIMO related information, etc. Note, either the transport-block (or payload size) or the code rate can be signaled. In any case these parameters can be calculated from each other by using the modulation scheme information and the resource information (number of allocated RBs).
Cat 3: HARQ related information, e.g. hybrid ARQ process number, redundancy version, retransmission sequence number L1/L2 Control Signaling Information for Downlink Data Transmission Along with the downlink packet data transmission, L1/L2 control signaling is transmitted on a separate physical channel (PDCCH). This L1/L2 control signaling typically contains information on:

The physical channel resource(s) on which the data is transmitted (e.g. subcarriers or subcarrier blocks in case of OFDM, codes in case of CDMA). This information allows the UE (receiver) to identify the resources on which the data is transmitted.
The transport Format, which is used for the transmission. This can be the transport block size of the data (payload size, information bits size), the MCS (Modulation and Coding Scheme) level, the Spectral Efficiency, the code rate, etc. This information (usually together with the resource allocation) allows the UE (receiver) to identify the information bit size, the modulation scheme and the code rate in order to start the demodulation, the de-rate-matching and the decoding process. In some cases the modulation scheme maybe signaled explicitly.
HARQ information:
Process number: Allows the UE to identify the HARQ process on which the data is mapped.
Sequence number or new data indicator: Allows the UE to identify if the transmission is a new packet or a retransmitted packet.
Redundancy and/or constellation version: Tells the UE, which hybrid ARQ redundancy version is used (required for de-rate-matching) and/or which modulation constellation version is used (required for demodulation)
UE Identity (UE ID): Tells for which UE the L1/L2 control signaling is intended for. In typical implementations this information is used to mask the CRC of the L1/L2 control signaling in order to prevent other UEs to read this information.

L1/L2 Control Signaling Information for Uplink Data Transmission

To enable an uplink packet data transmission, L1/L2 control signaling is transmitted on the downlink (PDCCH) to tell the UE about the transmission details. This L1/L2 control signaling typically contains information on:

The physical channel resource(s) on which the UE should transmit the data (e.g. subcarriers or subcarrier blocks in case of OFDM, codes in case of CDMA).
The transport format, the UE should use for the transmission. This can be the transport block size of the data (payload size, information bits size), the MCS (Modulation and Coding Scheme) level, the Spectral Efficiency, the code rate, etc. This information (usually together with the resource allocation) allows the UE (transmitter) to pick the information bit size, the modulation scheme and the code rate in order to start the modulation, the rate-matching and the encoding process. In some cases the modulation scheme maybe signaled explicitly.
Hybrid ARQ information:
Process number: Tells the UE from which hybrid ARQ process it should pick the data,
Sequence number or new data indicator: Tells the UE to transmit a new packet or to retransmit a packet.
Redundancy and/or constellation version: Tells the UE, which hybrid ARQ redundancy version to use (required for rate-matching) and/or which modulation constellation version to use (required for modulation).
UE Identity (UE Tells which UE should transmit data. In typical implementations this information is used to mask the CRC of the L1/L2 control signaling in order to prevent other UEs to read this information.

There are several different flavors how to exactly transmit the information pieces mentioned above. Moreover, the L1/L2 control information may also contain additional information or may omit some of the information. E.g.:

HARQ process number may not be needed in case of a synchronous HARQ protocol.
A redundancy and/or constellation version may not be needed if Chase Combining is used (always the same redundancy and/or constellation version) or if the sequence of redundancy and/or constellation versions is pre defined.
Power control information may be additionally included in the control signaling.
MIMO related control information, such as e.g. pre-coding, may be additionally included in the control signaling.
In case of multi-codeword MIMO transmission transport format and/or HARQ information for multiple code words may be included.

For uplink resource assignments (for transmissions on the Physical Uplink Shared CHannel (PUSCH)) signaled on PDCCH in LTE, the L1/L2 control information does not contain a HARQ process number, since a synchronous HARQ protocol is employed for LTE uplink. The HARQ process to be used for an uplink transmission is given by the timing. Furthermore it should, be noted that the redundancy version (RV) information is jointly encoded with the transport format information, i.e. the RV info is embedded in the transport format (TF) field. The TF respectively modulation and coding scheme (MCS) field has for example a size of bits, which corresponds to 32 entries. 3 TF/MCS table entries are reserved for indicating RVs 1, 2 or 3. The remaining MCS table entries are used to signal the MCS level (TBS) implicitly indicating RV0.

For details on the TBS/RV signaling for uplink assignments on PDCCH please see 3GPP TS 36.213, "Evolved Universal Terrestrial Radio Access (E-UTRA); Physical layer procedures", version 8.5.0, December 2008 (available at http://www.3gpp.org and incorporated herein by reference). The size of the CRC field of the PDCCH is 16 bits.

For downlink assignments (PDSCH) signaled on PDCCH in LTE the Redundancy Version (RV) is signaled separately in a two-bit field. Furthermore the modulation order information is jointly encoded with the transport format information. Similar to the uplink case there is 5 bit MCS field signaled on PDCCH. 3 of the entries are reserved to signal an explicit modulation order, providing no Transport format (Transport block) info. For the remaining 29 entries modulation order and Transport block size info are signaled.

Physical Uplink Control Channel (PUCCH)

The physical uplink control channel, carries uplink control information. UE never transmits simultaneously in the uplink control channel and uplink data channel. In case of simultaneous transmission of control and data, UE multiplexes control with data and transmits in the uplink data channel. The uplink control information could contain:

Uplink acknowledgement of decoded downlink transport blocks.
Channel quality information reporting for efficient downlink data transmissions.
Scheduling request for UL data transmission from UE to eNode B.

Further Advancements for 3GPP LTE, 3GPP LTE-A

The frequency spectrum for 1MT-Advanced was decided at the World Radiocommunication Conference 2007 (WRC-07) last November (Final Acts WRC-07, Geneva, November 2007). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved (see 3GPP TR 36.814, version 1.0.0, available at http://www.3gpp.org). The study item covers technology components to be considered for the evolution of E-UTRA, e.g. to fulfill the requirements on IMT-Advanced. Two major technology components which are currently under consideration for LTE-A are described in the following.

LTE-A Support of Wider Bandwidth

Carrier aggregation, where two or more component carriers are aggregated, is considered for LTE-Advanced in order to support wider transmission bandwidths e.g. up to 100 MHz and for spectrum aggregation.

A terminal may simultaneously receive or transmit one or multiple component carriers depending on its capabilities:

An LTE-Advanced terminal with reception and/or transmission capabilities for carrier aggregation can simultaneously receive and/or transmit on multiple component carriers.

An Rel-8 LTE terminal can receive and transmit on a single component carrier only, provided that the structure of the component carrier follows the Rel-8 specifications.

It shall be possible to configure all component carriers LTE Release 8 compatible, at least when the aggregated numbers of component carriers in the UL and the DL are same. Consideration of non-backward-compatible configurations of LTE-A component carriers is not precluded LTE-A Support of Relaying Functionality Relaying is considered for LTE-Advanced as a tool to improve e.g. the coverage of high data rates, group mobility, temporary network deployment, the cell-edge throughput and/or to provide coverage in new areas.

The relay node is wirelessly connected to radio-access network via a donor cell. The connection can be inband, in which case the network-to-relay link share the same band with direct network-to-UE links within the donor cell. Rel-8 UEs should be able to connect to the donor cell in this case.

outband, in which case the network-to-relay link does not operate in the same band as direct network-to-UE links within the donor cell With respect to the knowledge in the UE, relays can be classified into transparent, in which case the UE is not aware of whether or not it communicates with the network via the relay, and non-transparent, in which case the UE is aware of whether or not it is communicating with the network via the relay.

Depending on the relaying strategy, a relay may be part of the donor cell or control cells of its own.

In the case the relay is part of the donor cell, the relay does not have a cell identity of its own (but may still have a relay ID). At least part of the radio resource management (RRM) is controlled by the eNB to which the donor cell belongs, while parts of the RRM may be located in the relay. In this case, a relay should preferably support also Rel-8 LTE UEs. Smart repeaters, decode-and-forward relays and different types of Layer 2 relays are examples of this type of relaying.

In the case the relay is in control of cells of its own, the relay controls one or several cells and a unique physical-layer cell identity is provided in each of the cells controlled by the relay. The same RRM mechanisms are available and from a UE perspective there is no difference in accessing cells controlled by a relay and cells controlled by a "normal" Node B. The cells controlled by the relay should support also Rel-8 LTE UEs. Self-backhauling (Layer 3 relay) uses this type of relaying.

At least so-called "Type 1" relay nodes will be also introduced to of 3GPP LTE-A (see 3GPP TR 36.814, section 9.0). A "type 1" relay node (RN) is an inband relaying node characterized by the following properties:

The RN's control cells, each of which appears to a UE as a separate cell distinct from the donor cell.
The cells have their own Physical Cell ID and the relay node transmits its own synchronization channels, reference symbols, etc.
In the context of single-cell operation, the UE receives scheduling information and HARQ feedback directly from the relay node and sends its control channels (SR/CQI/ACK) to the relay node.

The RN appears as a Rel-8 Node B to Rel-8 UEs (i.e. will be backwards compatible).

For 3GPP LTE-A UEs, it should be possible for a type 1 relay node to appear differently than Rel-8 Node B to allow for further performance enhancement.

LTE-A Support of Coordinated Multipoint Transmission/Reception Functionality

Coordinated multi-point transmission/reception is considered for 3GPP LTE-A as a tool to improve the coverage of high data rates, the cell-edge throughput and/or to increase system throughput (see 3GPP TR 36.814, section 8.0). Downlink coordinated multi-point transmission implies dynamic coordination among multiple geographically separated transmission points. Examples of coordinated transmission schemes include:

- Coordinated scheduling and/or beamforming: Data to a single UE is instantaneously transmitted from one of the transmission points. Scheduling decisions are coordinated to control e.g. the interference generated in a set of coordinated cells.
- Joint processing/transmission: Data to a single UE is simultaneously transmitted from multiple transmission points, e.g. to (coherently or non-coherently) improve the received signal quality and/or cancel actively interference for other UEs Downlink coordinated multi-point transmission should include the possibility of coordination between different cells. From a radio-interface perspective, there is no difference from the UE perspective if the cells belong to the same Node B or different Node Bs. If inter-Node B coordination is supported, information needs to be signaled between Node Bs. The following feedback and measurement mechanisms from the UE are supported:

- Reporting of dynamic channel conditions between the multiple transmission points and the UE.
- Reporting to facilitate the decision on the set of participating transmission points.

Uplink coordinated multi-point reception implies reception of the transmitted signal at multiple, geographically separated points. Scheduling decisions can be coordinated among cells to control interference PDCCH Coding for LTE-A The PDCCH fields of the L1/L2 control information in 3GPP LTE, i.e. for a single component carrier assignment are exemplarily shown in the FIG. 2 for non-spatial multiplexing. In order to extend 3GPP LTE PDCCH to indicate multiple resource assignments on multiple component carriers for 3GPP LTE-A, different PDCCH coding schemes are being discussed in 3GPP RAN WG1 (see 3GPP TSG RAN WG1 Meeting #56, Tdoc. R1-090682, "PDCCH coding and mapping for carrier aggregation", February 2009, available at http//www.3gpp.org and incorporated herein by reference). A brief outline of the PDCCH coding options discussed in this document is given in the following.

Uplink Acknowledgment Modes for 3GPP LTE-A

The uplink ACK/NACK transmission methods should be designed to support both symmetric and asymmetric carrier aggregation. The baseline assumption for downlink component carrier assignment is one transport block (in the absence of spatial multiplexing) and HARQ entity per scheduled component carrier. Thus in case of a multiple component carrier assignment, the UE may have multiple HARQ processes in parallel. This would mean that multiple ACK/NACKs corresponding to the downlink component carrier transport blocks should be transmitted in the uplink. This is unlike the case in 3GPP LTE Rel'8 where a single ACK/NACK report is transmitted in uplink. Further, it could be possible in 3GPP LTE-A that control and data channel are simultaneously transmitted within a single sub-frame To acknowledge the received downlink transport block(s) different uplink ACK/NACK transmission modes are presently considered in the discussions of the 3GPP.

Uplink ACK/NACK Non-Bundling Mode

In this mode ACK/NACK for each downlink component carrier transport block is sent by the UE. The transmission of multiple ACK/NACKs is generally preferable for UEs with no power limitation. Furthermore, separate ACK/NACK for each transport block results in the transport blocks being non-bundled or uncorrelated. This means that transport blocks can be (re-)transmitted independently of each other. Hence this allows for use of an individual HARQ process for each transport block.

Uplink ACK/NACK Bundling Mode

In this retransmission mode a single ACK/NACK is transmitted for multiple downlink component carrier assignments from one UE. UE generates a single ACK/NACK report comprising of one bit for non-spatial multiplexing or at least two bits for spatial-multiplexing mode by performing a logical AND operation per codeword across all component carrier assignments (A codeword is one modulation symbol obtained from modulating a coded transport block (systematic and parity bits)—typically there are multiple codewords for a transport block). This scheme is supported in LTE Rel'8 TDD and is considered to be beneficial in certain scenarios of 3GPP LTE-A. Since the UE transmits a single ACK/NACK report, less power consumption for UE and hence lower coverage loss.

Further, since a single ACK/NACK is sent for multiple component carrier assignments, the retransmission probability is high. This is not efficient from PDSCH HARQ process perspective. This scheme could however be beneficial for UEs in power limited conditions.

In a way, ACK/NACK bundling bundles the corresponding component carrier assignments (transport blocks). Bundling of transport block means that same transport blocks for retransmission are considered as in initial transmission. Hence, this bundling of HARQ processes is not efficient, in case if the probability of ACK/NACK of the respective transport blocks is different.

SUMMARY OF THE INVENTION

One object of the invention is to suggest a mechanism for determining or dynamically configuring a retransmission mode of a retransmission protocol. Preferably, the mechanism should not imply an increased overhead to the control signaling and/or should not increase the complexity of a communication terminal.

The object is solved by the subject matter of the independent claims. Advantageous embodiments of the invention are subject matters of the dependent claims.

One aspect of the invention is to suggest a control message format that allows a dynamic signaling of the retransmission mode of a retransmission protocol. When for example implementing this aspect in a 3GPP LTE-A, this aspect could be formulated as providing a definition of a PDCCH format capable of signaling the retransmission mode for plural data transmissions (e.g. transport blocks or codewords). According to this aspect of the invention, the control message is designed to comprise a field that can be used to indicate a plurality of different codepoints. The codepoints that can be represented by the field are divided into at least two subsets, wherein the codepoints of each subset indicate a respective retransmission mode.

Furthermore, according to another aspect, the meaning of codepoints may differ from each other depending on the subset they are assigned. In other words, codepoints of different subsets may indicate different (interpretation of) parameters of the data transmissions, depending on the subset they are assigned, respectively the retransmission mode.

According to an embodiment of the invention, a method for determining a retransmission mode of a retransmission protocol for data transmissions provided to a communication terminal is proposed herein. According to this method, a control message related to plural data transmissions is received at a communication terminal. The control message comprises a field for indicating one of a plurality of codepoints, wherein the plurality of codepoints is divided into at least two subsets, each subset of codepoints indicating a respective retransmission mode for the plurality of data transmissions indicated by the control message. Based on codepoint signaled in said field of the control message, the retransmission mode of the retransmission protocol is determined.

In one exemplary embodiment of the invention, the plurality of codepoints that can be signaled in said field of the control message indicate retransmission protocol related information for the data transmissions, such as for example the new data indicators of the data transmissions and/or their redundancy versions. In an alternative embodiment of the invention, the plurality of codepoints that can be signaled in said field of the control message indicate retransmission protocol related and resource allocation related information of the data transmissions. Resource allocation related information is for example the modulation and coding scheme of the respective data transmissions, or individual parts thereof (i.e. modulation scheme, coding rate, etc.), the number of resource blocks allocated for the transmissions on one or more component carriers, etc.

Generally, it may be assumed that each codepoint is consisting of a number of N bits. According to another embodiment of the invention, each of the subsets of codepoints is indicating a number of combinations of redundancy versions and new data indicators for the data transmissions that is lower than the maximum number of combinations of redundancy versions and new data indicators for the data transmissions representable by N bits. In other words, the size of the codepoint (i.e. the number of bits thereof) is not simply chosen large enough to signal all possible combinations of redundancy versions and new data indicators for the data transmissions—as a result the signaling overhead can be reduced or kept constant although an additional transmission parameter, the retransmission mode can be signaled.

In a more specific example, it may be assumed that a respective subset i can represent $N_i$ different codepoints. The $N_i$ different codepoints that can be represented are chosen to be the $N_i$ most probable (or important) combinations of redundancy versions and new data indicators for the plurality of data transmissions. In other words, the combinations of redundancy versions and new data indicators for the data transmissions that are below a certain threshold likelihood of occurrence may not be signaled.

Furthermore, in a specific example, the combinations of redundancy versions and new data indicators for the plurality of data transmissions representable by the respective subsets of codepoints have a non-empty intersection. Formulated differently, a non-empty intersection essentially means that the subsets of codepoints respectively comprise (one or more) codepoints that indicate the same combinations of redundancy versions and new data indicators for the plurality of data transmissions.

In one exemplary embodiment of the invention, the retransmission mode is either one of:
an acknowledgment bundling mode, in which one acknowledgement for multiple data transmissions is transmitted, or
an acknowledgment non-bundling mode, in which an individual acknowledgement for each of the data transmissions is transmitted.

In a variation of this exemplary embodiment of the invention, the codepoints that can be signaled in said field of the control message further indicate retransmission protocol related information for the data transmissions. The interpretation of the codepoint signaled in said field of the control message is thereby depending on the retransmission mode indicated by the codepoint.

For example, the individual bits of the codepoint could indicate a joint new data indicator for multiple data transmissions and a joint new redundancy version for multiple data transmissions, if the codepoint in said field of the control message is indicating the acknowledgment bundling mode. This means that the same new data indicator applies to all data transmissions to which the control message relates and similarly that the same redundancy version is (to be) transmitted for all respective data transmissions to which the control message relates. Therefore the data transmissions are "bundled", i.e. are no longer unrelated.

If the codepoint in the field of the control message is indicating the acknowledgment non-bundling mode, the individual bits of the codepoint could for example indicate the respective new data indicator for each data transmission and the respective new redundancy version for each data transmission. In this case the each data transmissions are independent i.e. unrelated.

In another embodiment of the invention, the retransmission mode is either one of:
a synchronous retransmission mode, in which a synchronous retransmission protocol is used for the data transmissions, or
an asynchronous retransmission mode, in which an asynchronous retransmission protocol is used for the data transmissions.

In both examples of the retransmission mode, it is exemplarily implied that the plurality of codepoints is divided into two subsets. However, it is also possible to combine those two retransmission modes outlined above (acknowledgement mode and HARQ operation mode) to another retransmission mode by foreseeing a corresponding subdivision into subsets. If dividing the codepoints into fours subsets, it is possible to signal, for example, the following four retransmission mode options:
acknowledgment bundling with synchronous retransmissions,
acknowledgment non-bundling with synchronous retransmissions,
acknowledgment bundling with asynchronous retransmissions,
acknowledgment non-bundling with asynchronous retransmissions.

In a further embodiment of the invention the method further includes the step of receiving the data transmissions within a single sub-frame of a physical data channel, and acknowledging the reception of the data transmissions according to the determined acknowledgements mode.

In a further embodiment of the invention, being more specifically related to 3GPP LTE-A, the control message is L1/L2 control information transmitted via a Physical Downlink Control CHannel (PDCCH) from an eNode B to an user equipment or from an eNodeB to a relay node or from a relay node to an user equipment.

In another embodiment of the invention, the plurality data transmissions are transmitted in a sub-frame via respective component carriers on an air interface. In one example, a component carrier may be understood to be an equivalent to an LTE carrier of a 3GPP LTE system, or more generic, the component carrier is designating an aggregation of up to 110 resource blocks.

The control message of another embodiment of the invention comprises a resource allocation for allocating respective physical channel resources on a Physical Downlink Shared CHannel (PDSCH) for the data transmissions on the component carriers.

In addition to providing a method for determining a retransmission mode of a retransmission protocol for data transmissions, other embodiments of the invention relate to the implementation of such method by a communication terminal for use in a mobile communication system. A communication terminal could be for example, a mobile terminal, referred to as a Node B, user equipment in the 3GPP, or a relay node of a 3GPP system or any radio resource equipment of 3GPP/non-3GPP systems.

According to another aspect, the invention provides a communication terminal comprising a receiver for receiving a control message related to a plurality data transmissions, wherein the control message comprises a field for indicating one of a plurality of codepoints, wherein the plurality of codepoints is divided into at least two subsets, each subset of codepoints indicating a respective retransmission mode for the plurality of data transmissions indicated by the control message. The receiver of the communication terminal further receives the data transmissions using a retransmission protocol. The communication terminal also comprises a processing unit for determining the retransmission mode of the retransmission protocol based on codepoint signaled in said field of the control message.

The communication terminal according to a more specific embodiment is further equipped with a transmitter for acknowledging the data transmissions according to the retransmission mode indicated by the control message.

The communication terminal may further comprise a decoder for decoding the data transmissions and for determining, whether the respective data transmissions could be decoded successfully. The processing unit of the communication terminal is generating feedback for acknowledging the successful or unsuccessful reception of the data transmissions according to the retransmission mode indicated by the control message. For example, the processing unit could control the content and/or form of acknowledgement and/or the timing for transmitting the acknowledgement (e.g. asynchronous or synchronous feedback).

In another exemplary embodiment, the control message and the data transmissions are multiplexed in a single sub-frame of the physical channel resources at the communication terminal.

As indicated previously, the retransmission mode could be for example either one of:
  an acknowledgment bundling mode, in which one acknowledgement for all said data transmissions is transmitted, or
  an acknowledgment non-bundling mode, in which an individual acknowledgement for each said data transmissions is transmitted.

In a further embodiment of the invention, the processing unit generates a single joint acknowledgement for all data transmissions, if the retransmission mode indicated in the control message is the acknowledgment bundling mode. If the retransmission mode indicated in the control message is the acknowledgment non-bundling mode the processing unit generates individual acknowledgements for each respective data transmissions.

Furthermore, in another embodiment of the invention, the processing unit obtains a joint new data indicator for all data transmissions and a joint new redundancy version for all data transmissions from the codepoint signaled in the field of the control message, if the codepoint in said field of the control message is indicating the acknowledgment bundling mode. Moreover, if the codepoint in said field of the control message is indicating the acknowledgment non-bundling mode, the processing unit obtains the respective new data indicator for each data transmission and the respective new redundancy versions of for each data transmission from the codepoint signaled in the fields of the control message.

In a further embodiment of the invention, the communication terminal's processing unit provides the new data indicators, respectively the joint new data indictor of the data transmissions to a HARQ protocol entity of the communication terminal for controlling the flush of the soft buffer of the related HARQ process or processes used for transmitting the data transmissions. The processing unit also provides the redundancy versions, respectively joint redundancy version of the data transmissions to the decoder for rate matching.

As previously indicated, another option is that the retransmission mode is either one of:
  a synchronous retransmission mode, in which a synchronous retransmission protocol is used for the data transmissions, or
  an asynchronous retransmission mode, in which an asynchronous retransmission protocol is used for the data transmissions In this case and in a further embodiment of the invention, the communication terminal acknowledges the data transmissions by transmitting synchronous or asynchronous feedback according to the retransmission mode indicated in the control message.

Another aspect of the invention is the operation of a network node, such as a base station (also referred to as Node B). According to a further embodiment of the invention, the base station comprises a processing unit for generating a control message, the control message comprising a field for indicating one of a plurality of codepoints, wherein the plurality of codepoints is divided into at least two subsets, each subset of codepoints indicating a respective retransmission mode for a plurality of data transmissions indicated by the control message, and a transmitter for transmitting the control message using a retransmission protocol and for transmitting said plurality data transmissions to a communication terminal.

The base station according to a more specific embodiment of the invention also comprises a receiver for receiving an acknowledgement of the data transmissions from the communication terminal according to the retransmission mode indicated in the control message.

In another embodiment of the invention, the processing unit decides the retransmission mode for each plurality of data transmissions transmitted by the base station.

As in some examples above, the retransmission mode may for example be either one of:
  an acknowledgment bundling mode, in which one acknowledgement for all said data transmissions is transmitted, or an acknowledgment non-bundling mode, in which an individual acknowledgement for each said data transmissions is transmitted, In this case, the base station's transmitter will transmit a retransmission of all initial data transmissions, if the retransmission mode is the acknowledgment bundling mode and if the one acknowledgement is indicating an unsuccessful decoding of the initial data transmissions. If the retransmission mode indicated in the control message is the acknowledgment non-bundling mode, the base station's transmitter will transmit individual retransmissions for data transmissions for which the corresponding acknowledgement from the communication terminal indicates an unsuccessful decoding.

Another aspect of the invention is related to the implementation of the concepts of the invention according to the various embodiments of the invention described herein in software and/or hardware. According to this aspect, in another embodiment of the invention, a non-transitory computer-readable medium is provided. The non-transitory computer readable medium is storing instructions that, when executed by a processor of a communication terminal, cause the communication terminal to receive a control message related to a plurality data transmissions, wherein the control message comprises a field for indicating one of a plurality of codepoints, wherein the plurality of codepoints is divided into at least two subsets, each subset of codepoints indicating a respective retransmission mode for the plurality of data transmissions indicated by the control message, receive said data transmissions using a retransmission protocol, and determine the retransmission mode of the retransmission protocol based on codepoint signaled in said field of the control message.

In another embodiment of the invention the non-transitory computer-readable medium is storing instructions that, when executed by a processor of a base station, cause the base station to generate a control message, the control message comprising a field for indicating one of a plurality of codepoints, wherein the plurality of codepoints is divided into at least two subsets, each subset of codepoints indicating a respective retransmission mode for a plurality of data transmissions indicated by the control message, and transmit the control message using a retransmission protocol and for transmitting said plurality data transmissions to a communication terminal.

BRIEF DESCRIPTION OF THE FIGURES

In the following, the invention is described in more detail in reference to the attached figures and drawings. Similar or corresponding details in the figures are marked with the same reference numerals.

FIGS. 4 & 5 show examples of jointly coded L1/L2 control information for different data transmissions according to exemplary embodiments of the invention

DETAILED DESCRIPTION OF THE INVENTION

Figure 1:
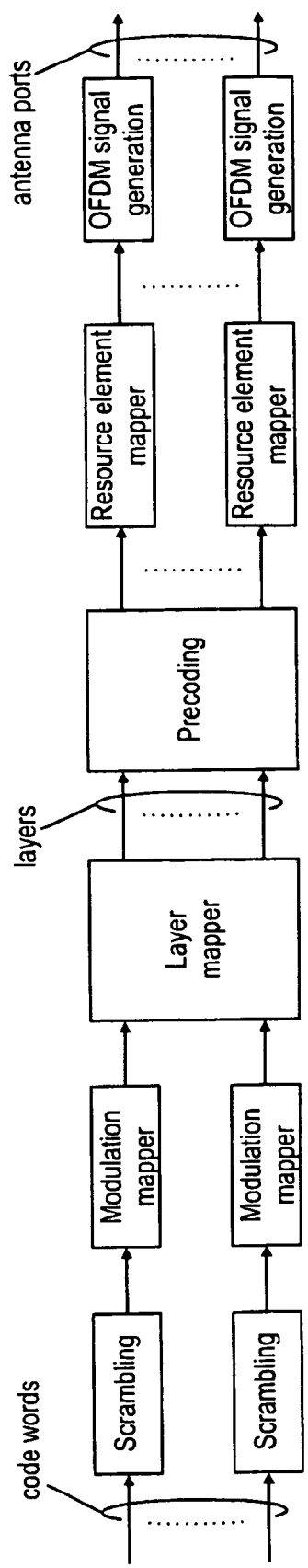
FIG. 1 shows the downlink baseband processing in LTE.

The following paragraphs will describe various embodiments of the invention. For exemplary purposes only, most of the embodiments are outlined in relation to an (evolved) communication system according to LTE and its currently developed advancements discussed in the Technical Background section above.

One aspect of the invention is to suggest a control message format that allows signaling a retransmission mode of a retransmission protocol for a plurality of data transmissions. The control message comprises a field that can be used to indicate a plurality of different codepoints. The codepoints that can be represented by the field (i.e. the values that can be indicated by the given number of bits forming the field in the control message) are divided into at least two subsets, wherein the codepoints of each subset indicate a respective retransmission mode.

Furthermore, according to another aspect, the meaning of codepoints may differ from each other depending on the subset they are assigned. Codepoints of different subsets may indicate different interpretation of parameters of the data transmissions, depending on the subset they are assigned, respectively the retransmission mode.

The different aspects of the invention are applicable to a 3GPP LTE-A system where the transmissions may be transmitted on individual component carriers.

Before discussing different exemplary embodiments of the invention in further detail in the following, some additional solutions for a mechanism determining or dynamically configuring a retransmission mode of a retransmission protocol are discussed in the following.

Assuming again for exemplary purposes the presently discussed advancements to 3GPP LTE, a signaling mechanism that allows using different retransmission modes is desirable. The main difference between 3GPP LTE and LTE-A is the increased bandwidth, respectively the LTE carrier aggregation, i.e. the LTE-A air interface provides multiple (presuming 5) LTE carriers (also referred to as component carriers in the 3GPP). Accordingly, in 3GPP LTE the control signaling related to the retransmission protocol is part of the L1/L2 control signaling via the PDCCH as discussed in the introduction of this document, In 3GPP LTE, the L1/L2 control signaling on the PDCCH is not only configuring parameters related to a retransmission protocol (i.e. HARQ), but is further used to allocate resources for the downlink transmission to the user equipment.

When extending the air interface to multiple component carriers, as planned for 3GPP LTE-A, the PDCCH signaling overhead for multiple transmissions on the component carriers should scale or even better be reduced in comparison to an aggregation of 3GPP LTE L1/L2 information for a corresponding number of transmissions. Accordingly, the mechanism for signaling a retransmission mode for the retransmission protocol (e.g. as part of an L1/L2 control signaling for LTE-A) should preferably not imply an increased overhead to the control signaling and/or should not increase the complexity.

Figure 2:
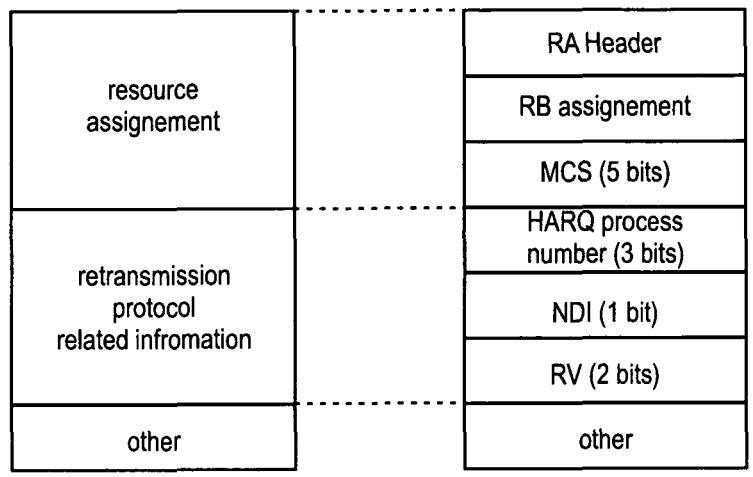
FIG. 2 gives an overview on the content of L1/L2 control information signaled for a UE on a PDCCH in 3GPP LTE.

Generally, for LTE-A the L1/L2 control information for the respective data transmissions (referred to as transport blocks (prior to coding) or code blocks (after coding of a transport block)) need to be signaled. A general overview on the content of L1/L2 control information signaled for a UE on a PDCCH in 3GPP LTE is exemplarily shown in FIG. 2. The PDCCH format shown in FIG. 2 illustrates the basic structure of the L1/L2 control information on the left hand side and a more specific implementation on the right hand side. The L1/L2 control information comprises a resource assignment part of the individual fields which indicate the allocated resource(s) for the downlink data transmission in the sub-frame. The L1/L2 control information of the resource assignment part comprises a resource assignment header (RA header) that is indicating resource allocation type to inform the UE on the format and interpretation of the resource assignment of the L1/L2 control information, in particular the resource block assignment (RB assignment). The resource assignment part further indicates the modulation and coding scheme as well as the resource blocks on the PDSCH on which the data transmission is sent.

A further part of the L1/L2 control information is the retransmission protocol related information, i.e. HARQ related information for the HARQ protocol used for transmitting the data transmission. This part typically contains fields for the HARQ process ID to identify the HARQ process corresponding to the data transmission, the new data indicator (NDI) to indicate the transmission of a new transport block/codeword, and the redundancy version (RV) of the transport block/codeword being sent on the PDCCH.

Finally, there may be other information included in the L1/L2 control information, which are however of no further relevance in the context of this invention.

If multiple data transmissions are supported via the different component carriers in 3GPP LTE within a sub-frame, respective L1/L2 control information may need to be available to the UE. Accordingly, different schemes for coding the individual L1/L2 control information for the different component carrier transmissions have been proposed, as outlined in the Technical Background section.

Figure 3:
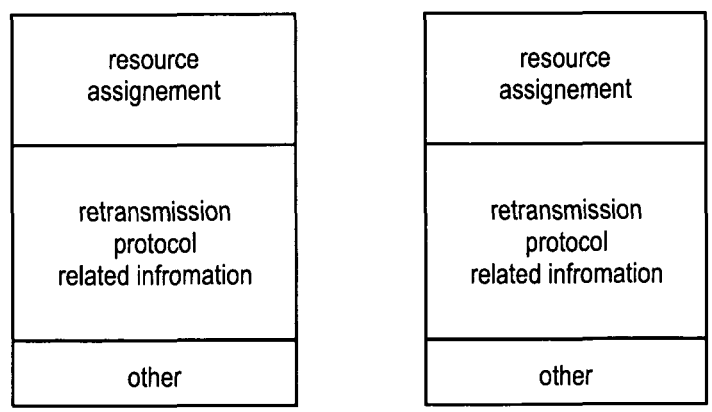
FIG. 3 shows a separate PDCCH coding scheme, where the control information for each component carrier is separately coded.

FIG. 3 exemplarily illustrates a separate PDCCH coding scheme, where the control information for each component carrier is separately coded, i.e. one PDCCH is sent for a respective component carrier transmission. Accordingly, the number of PDCCHs indicating the control information for downlink unicast data for a UE is identical to the number of component carriers transmitted to the UE. Assuming that the PDCCH is also detected using blind decoding, the total number of blind decoding attempts scales with number of component carriers the UE has to monitor.

Another possibility is a joint PDCCH coding, where control information for transport blocks in more than one component carrier is at least partly jointly coded to the UE in a given sub-frame. FIG. 4 and FIG. 5 show exemplary jointly coded PDCCH formats for two component carrier assignments (e.g. two transport blocks in case of non-spatial multiplexing).

The example of FIG. 4 is essentially similar to the example of FIG. 3 with regard to the signaled L1/L2 control information, except for the control information being comprised in a single (joint) PDCCH. In the example of FIG. 5, the PDCCH comprises some common fields, which are applied for transport block on all component carriers and some separate fields which are specific for transport block in the respective component carrier. The resource assignment part of the PDCCH for the respective component carrier data transmissions is signaled in separate fields, while the retransmission protocol (HARQ) related information for the component carrier transmissions is jointly coded Joint coding can reduce the PDCCH overhead for transport block assignments on multiple downlink component carriers compared to separately coded PDCCH. It should be noted that it is a matter of design, which fields of the PDCCH for the individual transmission on the component carriers are coded jointly and which are coded separately. Even if no fields in jointly coded PDCCH are common, the main overhead reduction with jointly coding PDCCH comes from the reduction of cyclic redundancy check (CRC) bits. Accordingly, different possible PDCCH formats using joint coding can be defined depending on the fields that are combined and considered as common for multiple transport blocks transmitted on the component carriers.

The information size of a jointly coded PDCCH may also depend on the number of transport blocks signaled on multiple component carriers. The payload size of the PDCCH may be fixed for any number component carrier assignments. This means use of the same POOCH payload size for all downlink transmission instances. Alternatively, the PDCCH variable payload size could also be possible depend on number of component carrier assignments, i.e. different payload size of PDCCH on each downlink transmission instance. The fixed payload size of jointly coded PDCCH is however beneficial since the blind decoding attempts is not increased compared to variable payload size of jointly coded PDCCH.

As indicated in the Technical Background section, it may be inter alia desirable to be able to dynamically configure the acknowledgement mode of the HARQ protocol, for example on a per sub-frame basis. One possible option to realize this object is to use higher layer signaling, such as Radio Resource Control (RRC) signaling to configure the acknowledgment mode. Though this solution might be advantageous from a blind decoding perspective, higher layer signaling is usually not fast enough (due to the signaling delay) and introduces larger overhead to allow for a very dynamic acknowledgment mode selection, in particular on a per sub-frame basis.

A second solution may be to include an additional field to the PDCCH format, so as to be able to explicitly indicate the desired acknowledgement mode for the transmissions within a sub-frame. This would however increase the overhead, given that the size of no other signaling field is reduced for compensation, and as the PDCCH format would result in another control information payload size, a further blind decoding attempt may be needed. However, this solution appears favorable in view of its flexibility, as acknowledgment mode selection on a per sub-frame basis would be possible.

As discussed above, in case of a jointly coded PDCCH for all transmission within a sub-frame, there could be different possible PDCCH formats depending on the fields that are combined for multiple transport blocks. In a third solution different PDCCH payload sizes are exploited to indicate the retransmission mode for the data transmissions within the sub-frame, in order to differentiate between a bundled and non-bundled ACK/NACK mode in the uplink.

Figure 6:
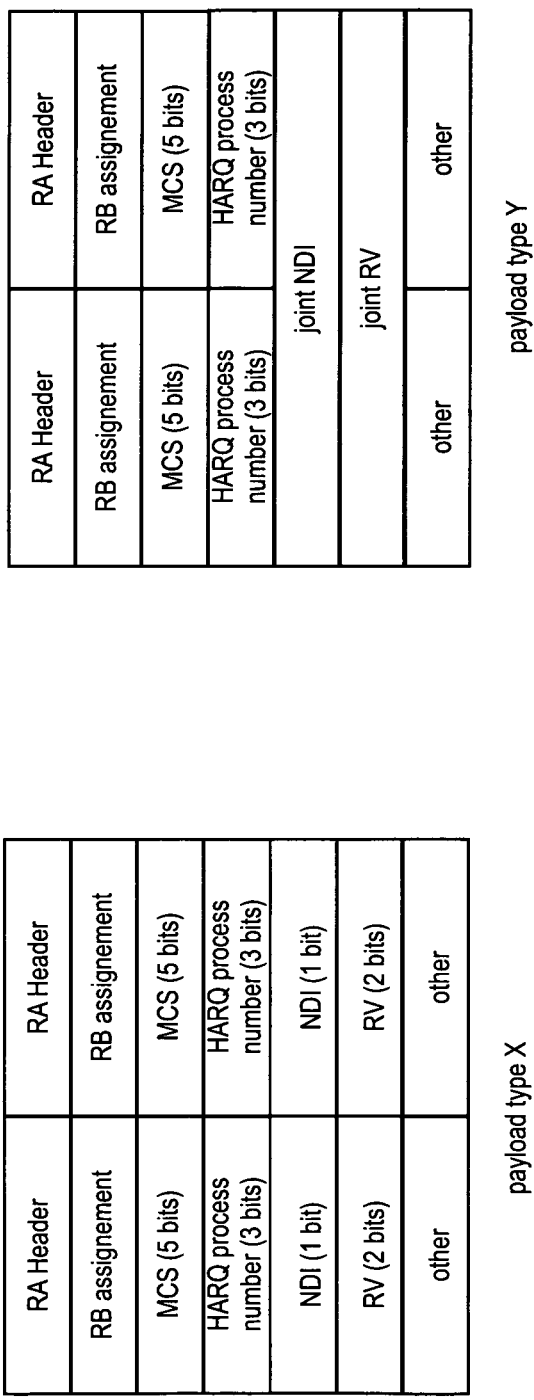
FIG. 6 shows two exemplary PDCCH formats.

Exemplary PDCCH formats having different payload sizes are illustrated in FIG. 6, showing an exemplary payload format type X and an exemplary payload format type Y. Payload format type X is used for a non-bundled acknowledgement mode, where a respective acknowledgement is sent for each data transmission within a sub-frame. Separate HARQ process related fields such as NDI, RV are provided for each transport block. With non-bundled NDI and RV fields, it is thus possible to indicate "individual" NDI and RV values for each transport block. The payload format type X comprises 2 NDI fields of one bit each (2 bits in total) considering an exemplary case of two transport blocks being transmitted on two component carriers (in case of non-spatial multiplexing) within the sub-frame and 2 RV field of 2 bits each (4 bits in total).

In total 6 bits are required for the NDI and RV fields and supports 64 different states/combinations as shown in the table below:

TABLE 1

| NDI for transport block 1 | NDI for transport block 2 | RV for transport block 1 | RV for transport block 2 |
|---|---|---|---|
| 0 | 0 | 0 | 0 |
|   |   | 0 | 1 |
|   |   | 0 | 2 |
|   |   | 0 | 3 |
|   |   | 1 | 0 |
|   |   | 1 | 1 |
|   |   | 1 | 2 |
|   |   | 1 | 3 |
|   |   | 2 | 0 |
|   |   | 2 | 1 |
|   |   | 2 | 2 |
|   |   | 2 | 3 |
|   |   | 3 | 0 |
|   |   | 3 | 1 |
|   |   | 3 | 2 |
|   |   | 3 | 3 |

This table can be easily extended to a total of 64 rows, for all combinations of the NDI values ((0,0), (0,1), (1,0) and (1,1)).

For payload format type Y the HARQ process related fields such as NDI and RV fields are combined for all transport blocks (bundled). This means that the NDI value and the redundancy version for all transport blocks in the sub-frame are the same. Accordingly, there is one joint NDI field (1 bit) common for multiple component carrier assignment/transport blocks signaled via jointly coded PDCCH and one join RV field (2 bits) common for multiple component carrier assignment/transport blocks signaled via jointly coded PDCCH.

In total, there are thus 3 bits required for bundled NDI and RV fields in payload format type Y which supports the signaling of 8 different states/combinations as shown in the table below:

TABLE 2

| Joint NDI | Joint RV |
|---|---|
| 0 | 0 |
| 0 | 1 |
| 0 | 2 |
| 0 | 3 |
| 1 | 0 |
| 1 | 1 |
| 1 | 2 |
| 1 | 3 |

This third solution is advantageous in that a very dynamic selection of the acknowledgement mode is supported. However, this is achieved at the costs of introducing two additional DCI formats for jointly coded PDCCH. Assuming that the PDCCH is to be decoded using blind detection as in 3GPP LTE, this means additional blind decoding attempts by the UE to receive the PDCCH.

Figure 7:
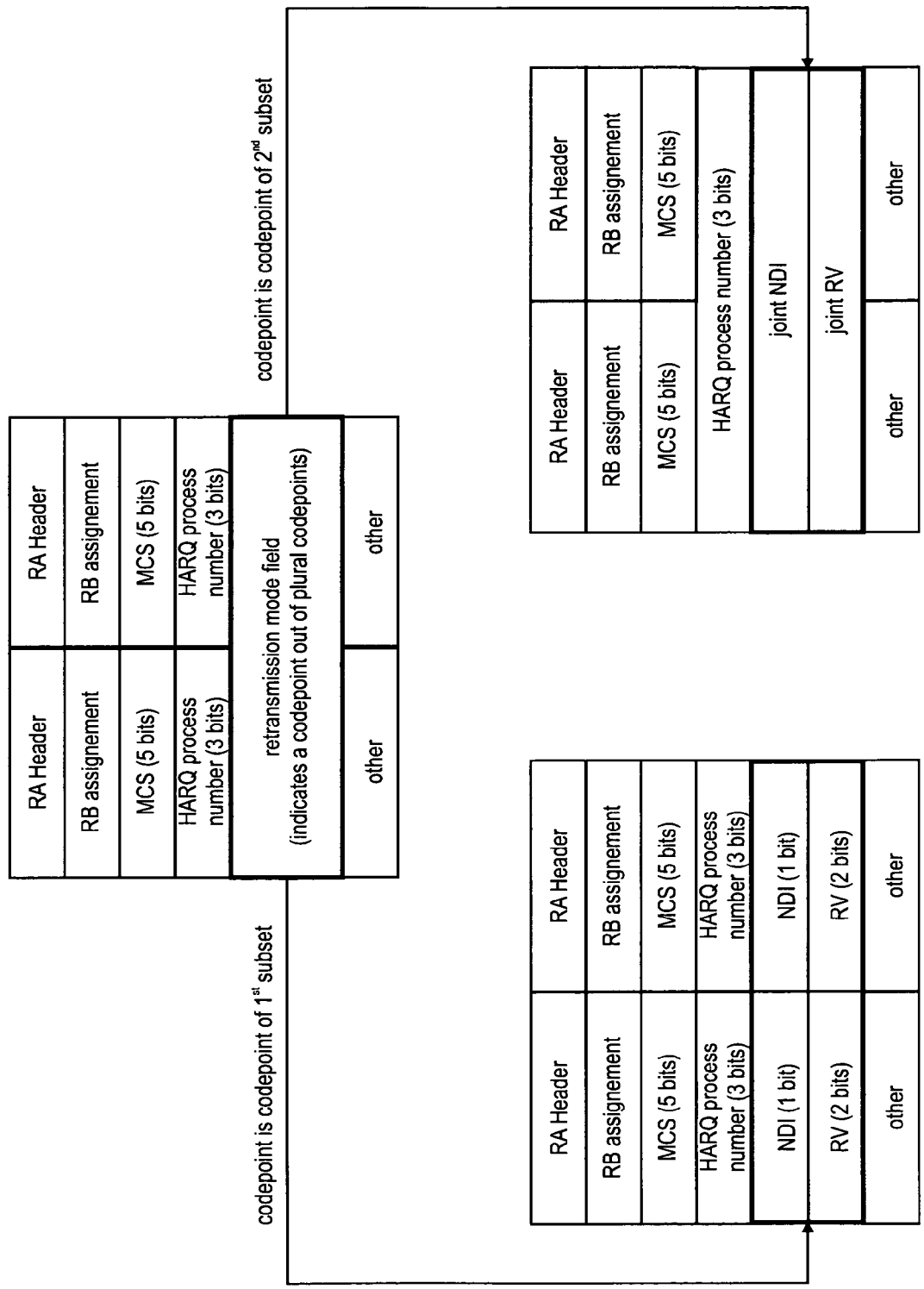
FIG. 7 shows an example of a PDCCH format for two component carrier assignments according to an exemplary embodiment of the invention.

A further improved PDCCH format according to an embodiment of the invention is defining a single format with one payload size (constant payload size). An example of such PDCCH format according to this embodiment of the invention is shown in FIG. 7. PDCCH format of FIG. 7 is exemplarily illustrating a format for two component carrier assignments.

The L1/L2 control information of the PDCCH format consists of two resource assignments, each comprising the fields: RA header comprising the resource assignment header as discussed above, RB assignment indicating the number of allocated resource blocks, and a MCS field for indicating the modulation and coding scheme. In this example, it is assumed that there are no joint resource assignments fields for the transmissions. As indicated above, it is also possible to reduce the overhead by jointly coding one or more fields, for example the MCS field, as applicable.

The retransmission protocol related information of the L1/L2 control information comprises two HARQ process number fields, each of which is indicating the respective HARQ process ID for a respective component carrier transmission. If the HARQ processes are aligned for the different transmission in the sub-frame overhead could be reduced by indicating a joint HARQ process number (3 bits) for all data transmissions of the sub-frame.

The PDCCH format of FIG. 7 further includes a retransmission mode field. As indicated by the terminology, this field indicates the retransmission mode for the data transmissions to which the L1/L2 control information is related. Furthermore, the field also indicates the NDI and RV parameters for the related data transmissions. Hence, the field basically has two functions, namely the identification of the retransmission mode and the signaling of retransmission protocol related information.

The field can represent one plural codepoints, the actual number of representable codepoints depending on the field size in terms of bits. For exemplary purposes, it is assumed in the following that the field size is 6 bits, so that a total of 64 different codepoints can be indicated.

The codepoints representable by the retransmission mode field are divided into plural subsets. The number of subsets for example depends on the number of different retransmission modes that should be indicated. For exemplary purposes, a division of the codepoints into two subsets is assumed in the following.

The codepoints of each subset indicate a respective retransmission mode. The table below shows an exemplary division of the codepoints of the retransmission mode field into a first subset (codepoints 0 to 59 indicating retransmission mode 1) and a second subset (codepoints 60 to 63 indicating retransmission mode 2).

TABLE 3

| Codepoint | NDI 1 | NDI 2 | RV 1 | RV 2 | Retransmission mode |
|---|---|---|---|---|---|
| 0 | 0 | 0 | 0 | 0 | Mode 1 |
| 1 | 0 | 0 | 0 | 1 |  |
| 2 | 0 | 1 | 1 | 2 |  |
| ... | ... | ... | ... | ... | ... |
| ... | ... | ... | ... | ... | ... |
| 28 | 1 | 0 | 0 | 0 |  |
| 29 | 1 | 1 | 0 | 0 |  |
| 30 | 0 | 0 | 2 | 2 |  |
| ... | ... | ... | ... | ... |  |
| 35 | 1 | 1 | 2 | 2 |  |
| ... | ... | ... | ... | ... |  |
| 58 | 0 | 1 | 3 | 1 |  |
| 59 | 0 | 0 | 3 | 1 |  |
| 60 | 0 | 0 | 0 | 0 | Mode 2 |
| 61 | 0 | 0 | 2 | 2 |  |
| 62 | 1 | 1 | 0 | 0 |  |
| 63 | 1 | 1 | 2 | 2 |  |

In Table 3 the retransmission mode may be for example the acknowledgement mode of the HARQ protocol. For example, mode 1 may correspond to the non-bundled acknowledgement mode, where individual feedback (ACK/NACK) is sent for each of the data transmissions, while mode 2 could be a bundled acknowledgement mode, where a joint HARQ feedback is sent for all data transmissions (i.e. there is a single ACK/NACK for all data transmissions of a sub-frame).

Using the bundled acknowledgment mode, the data transmissions are also "bundled" in that they are no longer independent from each other. Therefore, the NDI and RV should be the same for all data transmissions of a sub-frame. Hence, the total number of codepoints required to signal (reasonable) combinations of NDI and RV for the bundled acknowledgment mode is reduced in comparison to the non-bundled HARQ feedback mode (non-bundled acknowledgement mode). It may be therefore advantageous to have the majority of codepoints assigned to the first subset corresponding to the non-bundled acknowledgement mode when dividing the codepoints into subsets so that as many combinations of NDI and RV can be indicated for the data transmissions of non-bundled acknowledgement mode.

Nevertheless, assuming 1 bit for each NDI and 2 bits for each RV (i.e. there are four RVs for each transport block) a total of $64=2^6$ different codepoints would be needed to indicate all possible combinations of NDI and RV. As the field size of the retransmission mode field in FIG. 7 should not exceed the number of bits foreseen for NDI and RV indication in the corresponding 3GPP LTE PDCCH format (i.e. 3 bits for each transmission, resulting in 6 bits for two transmissions) to avoid additional overhead in comparison to the 3GPP LTE PDCCH format, it is clear that due to the subdivision of the codepoints in the retransmission mode field (6 bits in this example) the individual subsets of codepoints are not capable of indicating all possible combinations of NDI and RV for the different transmissions. This can be for example seen in Table 3, where for retransmission mode 2, only two redundancy versions RV 0 and RV 2 can be indicated.

In addition, it should be noted that some NDI and RV combinations presented in Table 3 for retransmission mode 1 and retransmission mode 2. Hence, the two subsets of codepoints may each comprise certain NDI and RV combinations. Expressed mathematically, the intersection of the subsets is not empty, if there are duplicate entries of NDI and RV combinations within the table.

Furthermore, FIG. 7 indicates how the content of the retransmission mode field (i.e. the codepoint) is interpreted depending on the given context. The context depends on the subset to which the individual codepoints signaled in the retransmission mode field of the L1/L2 control information belongs. The identification of the retransmission mode is implicit to the codepoint belonging to either the first or the second subset. In addition to this implicit indication of the retransmission mode, the codepoint indicates further retransmission protocol related information such as NDI and RV for the transmissions.

In case the codepoint belongs to the first subset of codepoints (retransmission mode 1), it may for example indicate the individual NDI and RV for each data transmission as shown in FIG. 7. Similarly, in case the codepoint belongs to the second subset of codepoints (retransmission mode 2), the codepoint could for example indicate a joint NDI and a joint RV for all data transmissions. It should be noted that the "joint" indication of a NDI or RV means that all data transmissions have the same NDI, respectively the same RV is signaled for all data transmissions. It is a matter of definition of whether this is considered a joint signaling of a parameter or the indication of the same parameter for each transmission.

As indicated above, due to the size limitation of the retransmission mode field and the division of the codepoints into subsets, the codepoint of each subset may not signal all possible combinations of NDI and RV for the transmissions. For the implementation, the most important combinations of NDI and RV for each subset should be identified so that the signaling of a reduced number of combinations in each subset does not deteriorate the retransmission or decoding performance of the data transmissions. In the following, an exemplary procedure on how to decide the NDI and RV combinations indicated or signaled by the codepoints in each subset is explained. In the following it is assumed for exemplary purposes that sequence of RVs used for (re-)transmission is 0→2→3→1.

Table 4 below shows the Probability Density Function (PDF) distribution of RV's of single transport block assuming 50% target Block Error Rate (BLER) for $1^{st}$ transmission and 50% BLER for each re-transmission (may be smaller in practice). This gives the probability of occurrence of RV values used in case of transmitting a single transport block via a component carrier.

TABLE 4

| Transmission Counter | 1 | 2 | 3 | 4 |
|---|---|---|---|---|
| RV | 0 | 2 | 3 | 1 |
| Probability of occurrence | 100% | 50% | 25% | 12.5% |
| PDF of RVs | 53% | 27% | 13% | 7% |

In case of transmitting two transport blocks with two RV field combinations in a sub-frame on distinct component carriers, the joint PDF of various combinations of RVs is shown in Table 5 assuming 50% BLER for $1^{st}$ transmission and 50% BLER for each re-transmission (may be smaller in practice).

Transport block TB1 and transport block TB2 are assumed to be uncorrelated in a given sub-frame. From Table 5 it can be seen that probability of the occurrence of the RV combinations depends on individual RV values. For example, the RV combination (0, 0) has a PDF of 28% and RV combination (1, 1) has a PDF of only 0.5%. It should be noted that in a real time system assuming 20% BLER for retransmission the PDF could be much smaller.

As can be seen from Table 5 certain combinations of RV fields have a very low probability of occurrence. RV combination (1, 1) has a PDF is 0.5%, which means that this combination of RVs for the transport blocks is seldom used for non-bundled acknowledgement mode. If this combination of RVs for the transport blocks cannot be signaled by a subset of codepoints of the retransmission mode field corresponding to the non-bundled acknowledgement mode, this would imply no significant performance loss, since this combination of RVs is extremely rarely used.

TABLE 5

| NDI for transport block TB1 | NDI for transport block TB2 | RV for transport block TB1 | RV for transport block TB2 | joint PDF of the two RVs |
|---|---|---|---|---|
| x | y | 0 | 0 | 28.00% |
|   |   | 0 | 2 | 14.00% |
|   |   | 0 | 3 | 6.89% |
|   |   | 0 | 1 | 3.70% |
|   |   | 2 | 0 | 14.00% |
|   |   | 2 | 2 | 7.29% |
|   |   | 2 | 3 | 3.50% |
|   |   | 2 | 1 | 1.89% |
|   |   | 3 | 0 | 6.89% |
|   |   | 3 | 2 | 3.50% |
|   |   | 3 | 3 | 1.69% |
|   |   | 3 | 1 | 0.91% |
|   |   | 1 | 0 | 3.70% |
|   |   | 1 | 2 | 1.89% |
|   |   | 1 | 3 | 0.91% |
|   |   | 1 | 1 | 0.50% |

Please consider that the RV combination (1,1) occurs for four different combinations of the NDI fields, so that not signaling this RV combination frees four codepoints for other purposes, e.g. to signal parameters for the bundled acknowledgement mode. Table 6 shows the NDI-RV-combinations, the codepoints of which can be redefined for indicating respective HARQ parameters for the bundling acknowledgement mode

TABLE 6

| Codepoint ("freed") | NDI for transport block 1 | NDI for transport block 2 | RV for transport block 1 | RV for transport block 2 |
|---|---|---|---|---|
| a | 0 | 0 | 1 | 1 |
| b | 0 | 1 | 1 | 1 |
| c | 1 | 0 | 1 | 1 |
| d | 1 | 1 | 1 | 1 |

Hence, the four codepoints a to d can be considered the second subset of codepoints which is implying the bundled acknowledgement mode for the HARQ feedback. Furthermore, to view it from a different angle, these four codepoints a to d can be considered removed or non existent for the first subset of codepoints which is implying the non-bundled acknowledgement mode. One example of how the meaning of the four codepoints a to d for can be redefined for the bundled acknowledgement mode is shown in Table 7 (see also Table 3).

TABLE 7

| Codepoint reused for bundled acknowledgement mode | Joint NDI | | Joint RV | |
|---|---|---|---|---|
|   | NDI for transport block 1 | NDI for transport block 2 | RV for transport block 1 | RV for transport block 2 |
| a | 0 | 0 | 0 | 0 |
| b | 0 | 0 | 2 | 2 |
| c | 1 | 1 | 0 | 0 |
| d | 1 | 1 | 2 | 2 |

This exemplary redefinition allows indicating two RVs when using a bundled acknowledgement mode. The two RVs should be sufficient for bundled acknowledgement mode, as this mode is typically used for power limited UEs. Assuming use of turbo coding and cyclic buffer rate matching, for code rate of 0.33 (or lower) all systematic and parity bits can be transmitted in a single transmission. The modulation scheme and coding rate reported by UE is shown in Table 8.

TABLE 8

| CQI index | modulation | code rate × 1024 | Coding rate | efficiency |
|---|---|---|---|---|
| 0 |   | out of range |   |   |
| 1 | QPSK | 78 | 0.08 | 0.1523 |
| 2 | QPSK | 120 | 0.12 | 0.2344 |
| 3 | QPSK | 193 | 0.19 | 0.377 |
| 4 | QPSK | 308 | 0.30 | 0.6016 |
| 5 | QPSK | 449 | 0.44 | 0.877 |
| 6 | QPSK | 602 | 0.59 | 1.1758 |
| 7 | 16QAM | 378 | 0.37 | 1.4766 |
| 8 | 16QAM | 490 | 0.48 | 1.9141 |
| 9 | 16QAM | 616 | 0.60 | 2.4063 |
| 10 | 64QAM | 466 | 0.46 | 2.7305 |
| 11 | 64QAM | 567 | 0.55 | 3.3223 |
| 12 | 64QAM | 666 | 0.65 | 3.9023 |
| 13 | 64QAM | 772 | 0.75 | 4.5234 |
| 14 | 64QAM | 873 | 0.85 | 5.1152 |
| 15 | 64QAM | 948 | 0.93 | 5.5547 |

Typically for power limited UEs, the modulation scheme will be QPSK and probably 16-QAM. In the exemplary mapping of CQI report to modulation and coding scheme as in Table 8, this means that the highest code rate employed for power limited UEs is 0.6. Even in case of the highest possible code rate of 0.6 with circular buffer rate matching, two transmissions would be sufficient to have all systematic and parity bits of the coded transport block being transmitted assuming different redundancy versions are used for two transmissions which is almost always the case.

Therefore, the possibility to indicate only two available RVs within the L1/L2 control information for the bundled acknowledgement mode should thus be sufficient and no (significant) performance loss is to be expected.

In summary, the definition of a PDCCH format that comprises a retransmission mode field as illustrated in FIG. 7 and as described above, allows for fast configuration of bundled/non-bundled acknowledgement modes on a per-sub-frame basis. Furthermore, no additional increase in the number of blind decoding attempts for the UE is to be expected. Additionally, this exemplary implementation according to an embodiment of the invention does not imply an additional overhead on the PDCCH for configuring bundled/non-bundled mode (relative to signaling the corresponding number of PDCCHs as defined in 3GPP LTE). Finally, no performance loss due to redefinition of codepoints is to be expected, as the redefined RV combinations are extremely rarely used for non-bundled acknowledgement mode, so no influence on the system is expected.

Figure 8:
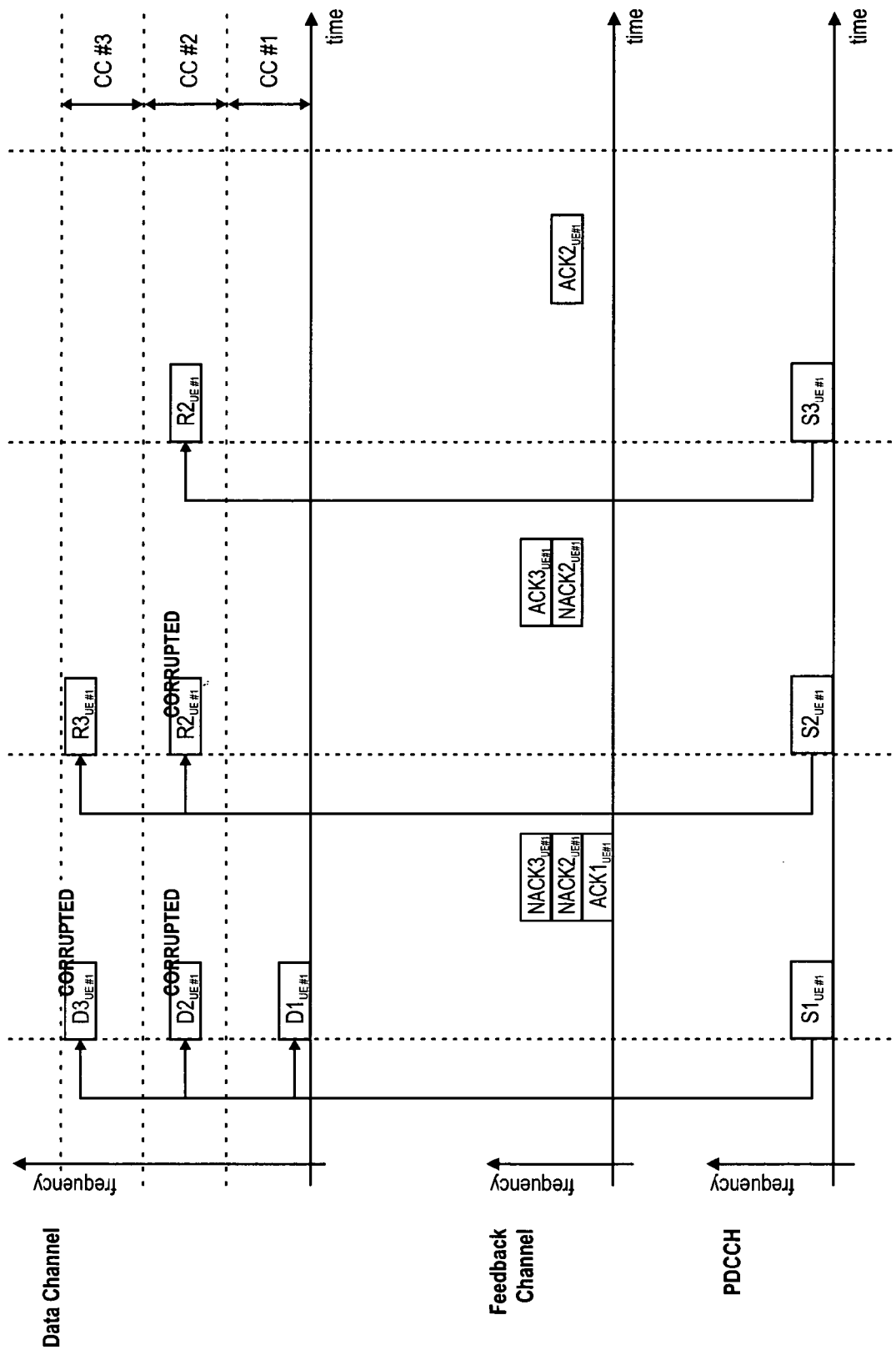
FIG. 8 to FIG. 10 show different exemplary exchanges of messages (or information) between communication entities according to exemplary embodiments of the invention.
Figure 9:
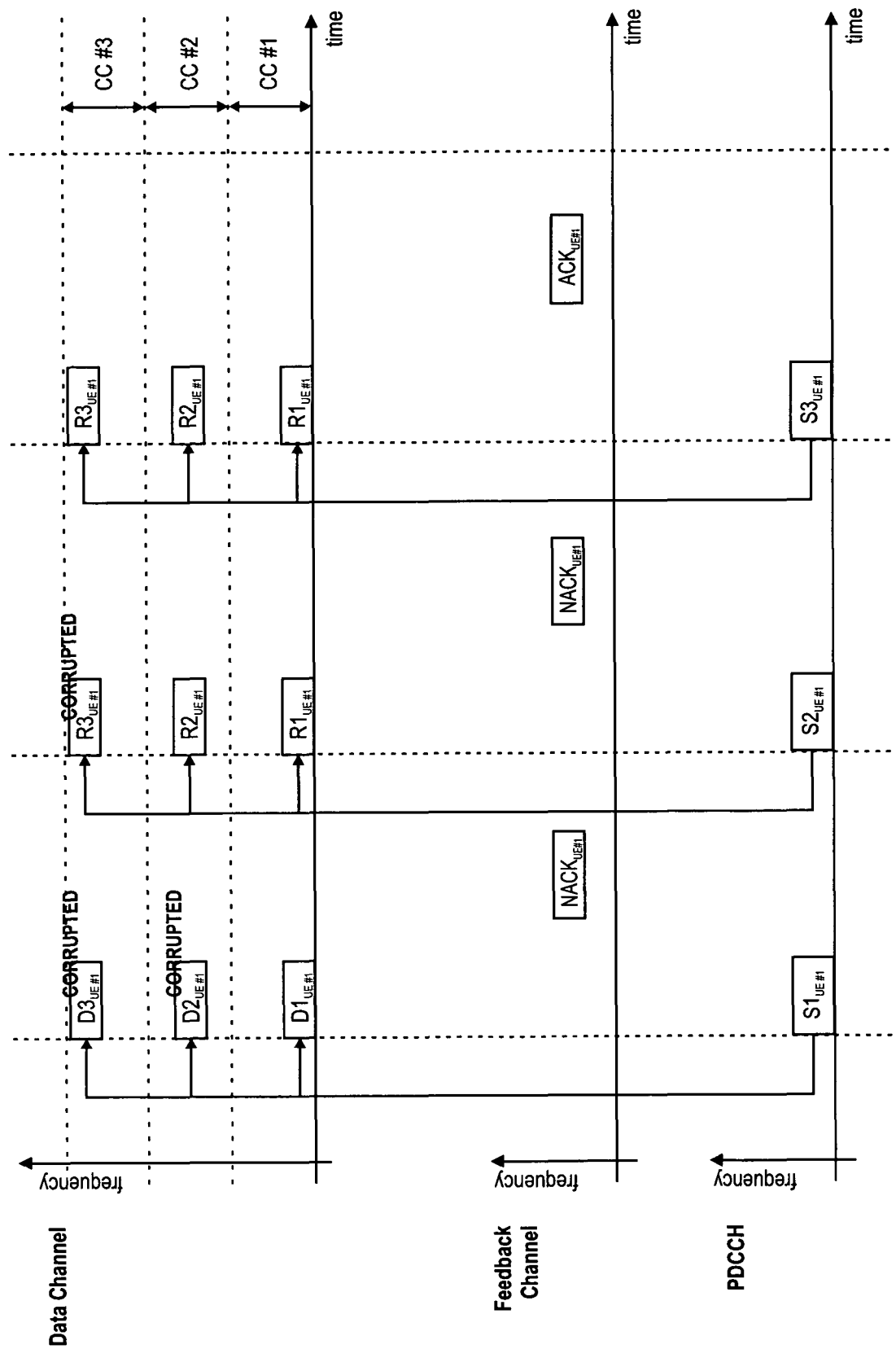

In the following an exemplary operation and signaling of a mobile communication system using the PDCCH format definition exemplified with respect to FIG. 7 will be described in connection with FIG. 8 and FIG. 9. FIG. 8 and FIG. 9 show different exemplary exchanges of messages (or information) between communication entities according to an exemplary embodiment of the invention. In FIG. 8 exemplarily relates to downlink transmission in a 3GPP LTE-A system.

It is assumed that an asynchronous HARQ protocol is used for the data transmissions on the downlink. This means that re-transmissions are scheduled by the system, i.e. respective resource assignment is signaled to the UE (UE #1) from the scheduler (in the Node B) for each retransmission. Furthermore, a scenario is investigated, where there are three data transmissions on three different component carriers (CC #1, CC #2, CC #3) of the data channel. In this example, the data channel may be a PDSCH (Physical Downlink Shared Channel).

The control channel associated to the data channel is the PDCCH, which carries the downlink assignments for the data transmissions on the data channel to inform the UE on the required parameters for correctly detecting, receiving and decoding the data transmission on the data channel. In one sub-frame, the Node B serving the UE signals a control message $S1_{UE\ \#1}$ comprising L1/L2 control information on the PDCCH to the UE. The UE to which the control message is destined may be for example indicated by masking the CRC to protect the content of the control message by a UE identifier, such as a RNTI in 3GPP LTE. Within the same sub-frame also the initial transmissions $D1_{UE\#1}$, $D2_{UE\#1}$ and $D3_{UE\#1}$ on component carriers CC #1, CC #2, and CC #3 are transmitted on the downlink physical channel resources. The resource allocation and retransmission protocol related information for the three initial transmissions $D1_{UE\ \#1}$, $D2_{UE\ \#1}$ and $D3_{UE\ \#1}$ is signaled in the control message $S_{UE\ \#1}$.

The control message $S_{UE\ \#1}$ comprises a retransmission mode field the representable codepoints of which are divided into to subsets, the codepoints of a respective subset indicating a bundled and a non-bundled acknowledgement mode, in a fashion essentially similar to the example given above with respect to FIG. 7. In FIG. 8, it is assumed that the codepoint signaled of the retransmission mode field in the control message $S_{UE\ \#1}$ indicates the non-bundled acknowledgment mode.

The UE receives the sub-frame and first extracts the control message $S1_{UE\ \#1}$ from the PDCCH. Based on the resource allocation part of the control message $S_{UE\ \#1}$ the UE is able to identify the resource blocks carrying the initial transmissions $D1_{UE\ \#1}$, $D2_{UE\ \#1}$ and $D3_{UE\ \#1}$ on component carriers CC #1, CC #2, and CC #3 and to demodulate same in its demodulator and to decode same using its decoder.

The UE (e.g. using its processing unit) reads the codepoint of the retransmission mode field in the control message $S_{UE\#1}$ and determines based thereon that the retransmission mode for the transmissions is the non-bundled acknowledgment mode. Assuming that the initial transmissions, $D2_{UE\ \#1}$ and $D3_{UE\#1}$ have not been successfully decoded in the UE, the UE sends a acknowledgement ($ACK1_{UE\ \#1}$) for initial transmission $D1_{UE\ \#1}$ and negative acknowledgements ($NACK2_{UE\ \#1}$ and $NACK3_{UE\ \#1}$) for initial transmissions $D2_{UE\ \#1}$ and $D3_{UE\ \#1}$ to the Node B via a feedback channel (ACK/NACK channel).

There are different possibilities for sending multiple ACK/NACKs. In a first scheme, ACK/NACK with channel selection assuming non-spatial multiplexing, the UE transmits two ACK/NACK information bits on the corresponding uplink ACK/NACK resource to the Node B. The two ACK/NACK information bits and the ACK/NACK channel for transmission is selected depending on the individual states of ACK/NACK corresponding to all transport blocks (e.g. initial transmissions $D1_{UE\ \#1}$, $D2_{UE\ \#1}$ and $D3_{UE\ \#1}$ for the initial transmissions of the transport blocks) on the downlink component carrier.

In case of spatial multiplexing wherein individual codewords are sent via respective antennas (Multiple Input Multiple Output (MIMO) scenario), HARQ feedback corresponding to all codewords within a single component carrier is bundled using a logical AND operation on the decoding results of individual codewords within a component carrier. This results in single acknowledgement for multiple codewords within a single component carrier. Further two ACK/NACK information bits corresponding to transport blocks on multiple component carriers is transmitted and channel for ACK/NACK transmission is selected similar to the non-spatial multiplexing case.

In this case, where spatial multiplexing is used, i.e. individual codewords are sent via respective antennas, the UE always transmits a 2 bit ACK/NACK report using QPSK modulation. There could be a coverage loss due to higher order modulation scheme. Further, it requires multiple PUCCH resources for channel selection and the number of required ACK/NACK channels increases with the number of component carriers aggregated. The Node B is required to blindly detect the actual resource used by UE for ACK/NACK transmission. This scheme is efficient from the PDSCH HARQ performance point of view, since an individual ACK/NACK value for each downlink transport block is known to the Node B. To improve the coverage BPSK modulation could be employed with additional increase in ACK/NACK channels.

Another scheme for sending multiple ACK/NACKs is multi-code transmission, which may be for example used in a CDM (Code Division Multiplex)-based uplink, such as for example an uplink based on MC-CDMA (Multi Carrier-Code Division Multiple Access). Multiple code resources corresponding to each downlink component carrier transport blocks are reserved for each UE. The UE transmits multiple ACK/NACKs using each reserved code resource.

As each downlink component carrier transport block is individually ACK/NACK-ed by the UE and also DTX (Discontinued Transmission) detection is possible in all cases, this scheme allows an efficient PDSCH HARQ performance. The transmission power is divided between the transmitted uplink ACK/NACKs, which requires a higher UE transmission power depending on the number of transmitted uplink ACK/NACKs, which may however, be considered acceptable for UE's with no power limitation.

Finally, a fourth scheme for sending multiple ACK/NACKs is to use the PUCCH with larger information size. In this case multiple ACK/NACKs corresponding to each downlink component carrier transport block are jointly encoded into a codeword and transmitted on the uplink.

Irrespective of the scheme used for transmitting the acknowledgments for the initial transmissions $D1_{UE\ \#1}$, $D2_{UE\#1}$ and $D3_{UE\#1}$ to the Node B, it can be assumed that the Node B can identify the incorrectly decoded transmissions and sends retransmissions $R2_{UE\#1}$ and $R3_{UE\#1}$ for the failed initial transmissions $D2_{UE\ \#1}$ and $D3_{UE\ \#1}$. Due to using an asynchronous HARQ protocol, retransmissions $R2_{UE\ \#1}$ and $R3_{UE\#1}$ are sent together with an accompanying control message $S2_{UE\ \#1}$ comprising L1/L2 control information on the PDCCH. The UE receives the retransmissions $R2_{UE\ \#1}$ and $R3_{UE\#1}$ and performs a soft-combining thereof with the corresponding initial transmission $D2_{UE\ \#1}$ and $D3_{UE\#1}$, to subsequently decode the soft-combined transmissions. This time it may be assumed that the UE is capable of decoding the data transmission on component carrier CC #3 correctly, while the data transmission on component carrier CC #2 can still not be decoded successfully.

Accordingly, the UE sends a positive acknowledgement $ACK3_{UE\#1}$ and a negative acknowledgement $NACK2_{UE\#1}$ to the Node B in a similar fashion as for the HARQ feedback on the initial transmissions $D1_{UE\ \#1}$, $D2_{UE\ \#1}$ and $D3_{UE\ \#1}$. The Node B again received the HARQ feedback $NACK2_{UE\#1}$ and ACK3$_{UE\ \#1}$ and provides another retransmission R2$_{UE\ \#1}$ to the UE. This time the UE is capable of decoding the transmission on component carrier CC #2 and sends a corresponding positive acknowledgement ACK2$_{UE\ \#1}$ to the Node B.

Turning now to FIG. 9, essentially the same scenario as discussed in relation to FIG. 8 is shown. In FIG. 9 however, it is assumed that the control message S1$_{UE\ \#1}$ on the PDCCH carries a codepoint in the retransmission mode field that indicates the bundled acknowledgement mode. Accordingly, upon the UE having received the initial transmissions D1$_{UE\ \#1}$, D2$_{UE\ \#1}$ and D3$_{UE\ \#1}$ from the Node B via component carriers CC #1, CC #2, and CC #3, and assuming again that the initial transmissions D2$_{UE\ \#1}$ and D3$_{UE\ \#1}$ are corrupted, the UE (e.g. using its processing unit) will generate a joint HARQ feedback, i.e. one single acknowledgement for all three transmissions. This may be for example realized by performing a logical AND combination of the decoding status of the initial transmissions D1$_{UE\ \#1}$, D2$_{UE\ \#1}$ and D3$_{UE\ \#1}$ assuming that a successful decoding is represented by a bit set to 1 and an unsuccessful decoding is represented by a bit set to 0. A combination result of 0 (1) will thus imply the signaling negative (positive) feedback.

Here, as transmissions D2$_{UE\#1}$ and D3$_{UE\#1}$ are corrupted, the UE will generate a single NACK$_{UE\#1}$ that is transmitted to the Node B. The Node B received the acknowledgement. As it is not capable of distinguishing, which of the initial transmissions D1$_{UE\#1}$, D2$_{UE\#1}$ and D3$_{UE\#1}$ has been not successfully decoded, retransmissions R1$_{UE\#1}$, R2$_{UE\#1}$ and R3$_{UE\#1}$ for all transmissions on the three component carriers are sent until the joint acknowledgement from the UE indicates a positive acknowledgement, meaning that all three transmissions are successfully decoded at the UE.

In the exemplary embodiment of the invention described with respect to FIG. 8 and FIG. 9 above, it has been assumed that the retransmission mode field is indicating whether the non-bundled or bundled acknowledgements should be sent for the three transmissions on component carriers CC #1, CC #2, and CC #3. In another embodiment, the retransmission mode field of the control message S1$_{UE\#1}$ implicitly indicates whether a synchronous or an asynchronous retransmission protocol should be used for the transmissions on component carriers CC #1, CC #2, and CC #3. In this embodiment, it is assumed that a non-bundled acknowledgement mode is used.

Returning to FIG. 8, it may be assumed that the retransmission mode field of the control message S$_{UE\ \#1}$ on the PDCCH for the transmissions component carriers CC #1, CC #2, and CC #3 indicates an asynchronous HARQ operation. Accordingly, the retransmissions R2$_{UE\#1}$ and R3$_{UE\#1}$ for the transmissions on component carriers CC #2 and CC #3 are sent by the Node B with an accompanying control message S2$_{UE\ \#1}$ and S3$_{UE\ \#1}$ on the PDCCH comprising the resource allocation for the retransmissions.

Figure 10:
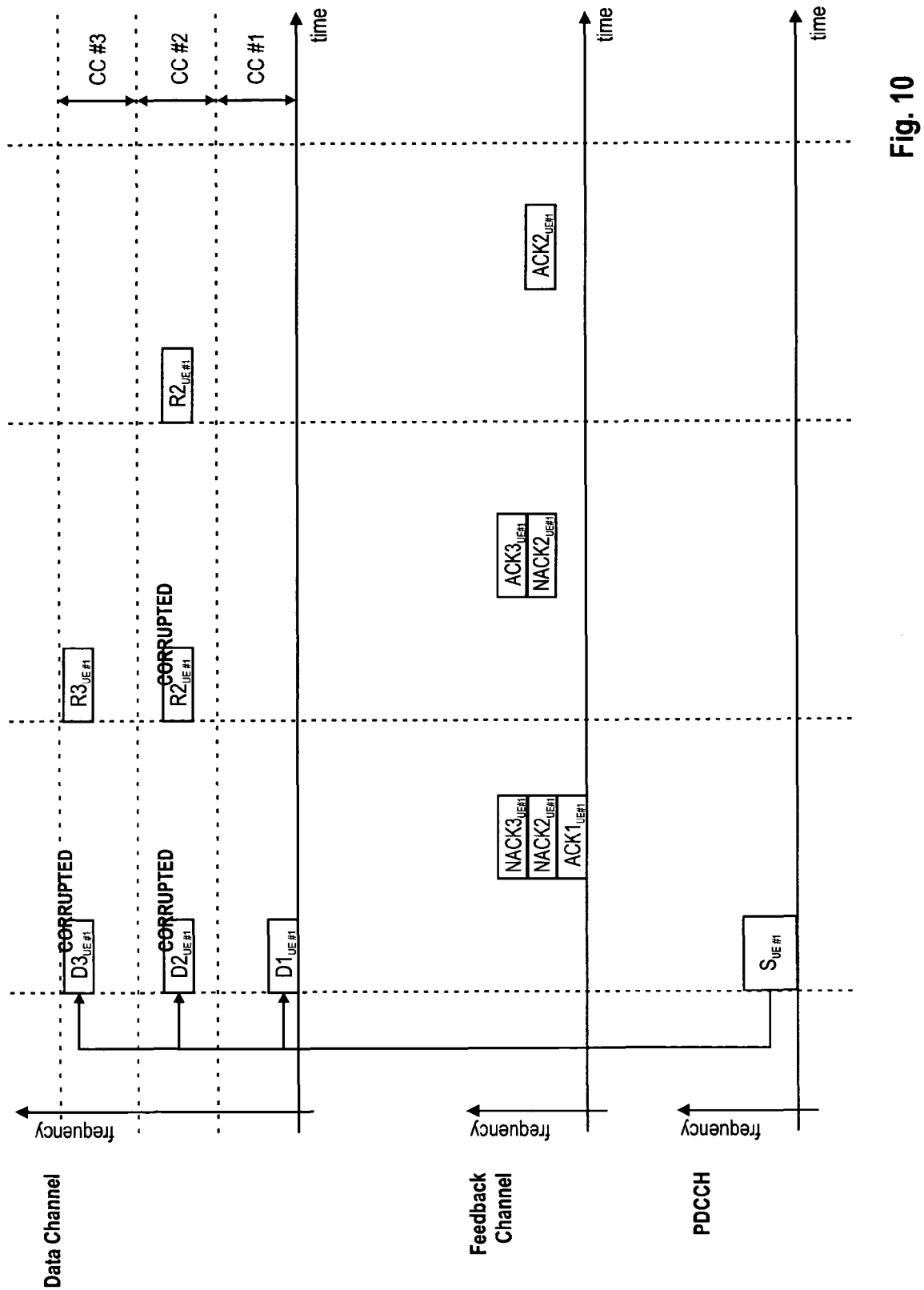

In FIG. 10, it is assumed that the codepoint in the retransmission mode field of the control message S1$_{UE\ \#1}$ is indicating an synchronous retransmission mode. Accordingly, retransmissions R2$_{UE\#1}$ and R3$_{UE\#1}$ for the transmissions on component carriers CC #2 and CC #3 are not scheduled but are autonomously sent on a known physical channel resource(s) to the UE without any explicit resource allocation being sent by the Node B.

Furthermore, it is also possible that the retransmission mode field in the L1/L2 control information on a PDCCH indicates both, the acknowledgement mode and the mode (asynchronous/synchronous) for sending the retransmissions.

In the example given above with respect to Table 3, it has been exemplarily assumed that four codepoints of the retransmission mode field form the subset indicating retransmission mode 2. Of course (assuming again the transmission of two transport blocks per sub-frame case), it is also possible to redefine more than the four codepoints corresponding to a specific combination of redundancy versions. For example, to reuse 8 codepoints for indicating retransmission mode 2, the NDI-RV combinations otherwise indicating (NDI1,NDI2, RV1,RV2)=(x,y,1,1), (x,y,1,3) for the retransmission mode 1 could be redefined (where x and y indicate arbitrary NDI values of the two transports blocks), since these RV combinations are used less than 1% for transmissions. Accordingly, the performance loss by no longer being able to signal these RV combinations for the non-bundled acknowledgement mode appears acceptable. A possible redefinition is shown in Table 9.

TABLE 9

| Codepoint reused for bundled acknowledgement mode | Joint NDI | | Joint RV | |
|---|---|---|---|---|
| | NDI for transport block 1 | NDI for transport block 2 | RV for transport block 1 | RV for transport block 2 |
| a | 0 | 0 | 0 | 0 |
| b | 0 | 0 | 2 | 2 |
| c | 0 | 0 | 3 | 3 |
| d | 0 | 0 | 1 | 1 |
| e | 1 | 1 | 0 | 0 |
| f | 1 | 1 | 2 | 2 |
| g | 1 | 1 | 3 | 3 |
| h | 1 | 1 | 1 | 1 |

Assuming again a retransmission mode field size of 6 bits, this means that the number of codepoints (forming the first subset) for signaling NDI-RV combinations for the non-bundled acknowledgement mode would be reduced to 64−8=56 codepoints, which allows for signaling up to 14 RV combinations (for two transport blocks) assuming that arbitrary (i.e. 4) NDI combinations for each RV combination can still be signaled. Those 14 RV combinations that can still be represented by the 56 codepoints may be for example the 14 most likely (important) RV combinations occurring for the two transport blocks. With 8 codepoints in the second subset for signaling the bundled acknowledgement mode, all RV combinations (i.e. same RV for all transmissions in the bundled-acknowledgement mode) could be indicated in Table 9.

In another embodiment invention, only two codepoints are reused for signaling retransmission mode 2 (compare Table 3). For example, these two codepoints may be those that would otherwise be used to indicate (NDI1,NDI2,RV1, RV2)=(0,1,1,1), (1,0,1,1) for retransmission mode 1. In this example the redefined RV combination of (1,1) is used for both bundling and non-bundling mode. Assuming some correlation of transport block TB1 and transport block TB2 performance, these two codepoints with NDI combinations (0,1) and (1,0) are the least probable for non-bundled HARQ process. As shown in Table 10, (NDI1,NDI2)=(0, 0) and (1,1), could be indicate bundled acknowledgement mode operation of the retransmission protocol, while (NDI1,NDI2)=(0,1) and (1,0) could be used to indicate a non-bundled acknowledgment mode.

TABLE 10

| Codepoint reused for bundled acknowl-edgement mode | RV for transport block 1 | RV for transport block 2 | NDI for transport block 1 | NDI for transport block 2 | Re-transmission mode |
|---|---|---|---|---|---|
| a | 1 | 1 | 0 | 0 | Bundled |
| b | 1 | 1 | 0 | 1 | Non-bundled |
| c | 1 | 1 | 1 | 0 | Non-bundled |
| d | 1 | 1 | 1 | 1 | Bundled |

This way, the RV combinations are available for both bundled and non-bundled acknowledgement mode. However, this exemplary implementation supports only a single RV value for the bundled acknowledgement mode of the retransmission protocol.

In the exemplary embodiments described above, the retransmission mode indicated by the control message has influenced the interpretation of the codepoints to derive NDI and RV for multiple data transmissions. As the bundled acknowledgement mode is likely to be used for power limited UEs, which typically use a low level modulation and coding scheme. Hence, the in a further embodiment of the invention, the control message could be used to indicate the bundled acknowledgement mode for those UEs that use a low MCS (TBS) levels (i.e. below a given threshold MCS level). In a typical scenario, these low MCS (TBS) level UEs are for example the power limited UEs.

In this exemplary embodiment of the invention, the (un-likely) RV combination (1,1) is also kept available for the non-bundled acknowledgement mode for large MCS levels (e.g. larger than 64-QAM, code rate 0.7), which are typically used by non-power limited UEs.

For example, the four codepoints a to d of the NDI-RV combinations as shown in Table 6 could be used to for indicating the bundled acknowledgement mode. Table 11 exemplarily shows the modulation order of the transport block as indicated by the modulation index field signaled within the control message on the PDCCH. Note that this table is shown for exemplary purpose only and in real systems the table could be larger indicating different modulation order for different transport block sizes.

In this exemplary case, the codepoints a to d are freed for indicating the bundled acknowledgment mode only if the modulation order is 2. If the modulation order indicated in the control message is for example 6 the codepoints a to d are retained for indicating the non-bundled acknowledgment mode and the retransmission mode field indicates respective NDIs and RVs for each data transmission. This way, codepoints a to d are available for the bundled and the non-bundled acknowledgement mode depending on the signaled modulation order in the control message.

TABLE 11

| Modulation index | Modulation Order |
|---|---|
| 0 | 2 |
| 1 | 4 |
| 2 | 6 |

Alternatively, the indicating of the retransmission mode could depend on the modulation and coding scheme (MCS) index signaled in the control message, from which the modulation order and transport block size (TBS) index can be derived. An example is shown in Table 12.

TABLE 12

| MCS Index | Modulation Order | TBS Index |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

Table 13 exemplarily illustrates how the transport block size (TBS) can be derived based on the TBS index indicated in Table 12 and the resource block allocation size. The code rate is implicit and can be determined from modulation order in Table 12, transport block size, and resource allocation size as exemplarily shown in Table 13.

TABLE 13

| TBS index | Transport Block Size TBS (for k ∈ [1, ..., 10] allocated RBs) | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |

TABLE 13-continued

| TBS index | Transport Block Size TBS (for k ∈ [1, ..., 10] allocated RBs) | | | | | | | | | |
|---|---|---|---|---|---|---|---|---|---|---|
| | 1 | 2 | 3 | 4 | 5 | 6 | 7 | 8 | 9 | 10 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

Table 12 and Table 13 could be used in combination to determine how to interpret the retransmission mode field of the control message, respectively whether codepoints a to d of this field are used to indicate bundled acknowledgement mode or non-bundled acknowledgement mode.

For example, a typical scenario where the bundled acknowledgement mode may be advantageously used is the case of power limited UEs. For power limited UEs the modulation order may be expected to be low, e.g. modulation order 2, i.e. MCS indices 0 to 9 in Table 12 together with a small transport block size (e.g. TBS indices 0 to 8 and RB allocation size of 1 to 5 as shown in Table 13). In case the MCS field in the control message yields a modulation order of 2 (or one of the respective MCS index and RB allocation size combinations), the codepoints a to d in Table 6 are indicating the bundled acknowledgement mode, and in other cases the codepoints indicate the non-bundled acknowledgment mode.

Hence, in this exemplary embodiment of the invention, the content of the MCS field(s) within the control message signaled on the PDCCH indicates, whether the codepoints of the retransmission mode field are to be consider divided into different subsets to indicate respective retransmission modes or not.

In another exemplary embodiment, the ideas presented herein can be also used to reduce the size of the retransmission mode field (i.e. the number of bits required to indicate NDI and RV for the different data transmissions) in comparison to an aggregation of L1/L2 control information for the different transmissions. For the example of two data transmission on respective component carrier, this may allow for a reduction of the field size from 6 bits (2 NDI bits and 4 RV bits) to 5 bits. This may for example be realized by not signaling rarely used NDI-RV combinations at all. From the example in Table 5 there are combinations which have joint probability of occurrence of less than 3.6%. If these combinations are not signaled, i.e. no corresponding codepoints are foreseen in the retransmission mode field of the control message, performance of the retransmission protocol may not be significantly deteriorated. Overall, 50% of NDI-RV combinations may not be required as shown by columns in Table 5 colored gray.

Hence, when signaling only NDI-RV combinations that are above a given threshold/joint probability of occurrence (i.e. when foreseeing only codepoints for those NDI-RV combinations), the control information overhead can be reduced.

In another exemplary embodiment of the invention, not only the retransmission mode for multiple data transmissions may be indicated, but also the transmission mode for the HARQ feedback. As discussed above, there exists different options how the HARQ feedback can be signaled, e.g. multicode transmission, multiplexing, multichannel, etc. In one example, the codepoints of one or more subsets can be again further subdivided to indicate respective transmission mode for the acknowledgements. An example, where a subset of codepoints indicating a retransmission mode 1 is further capable of indicating one out of three transmission modes for the acknowledgments is shown in Table 14 below. Hence, in addition to the retransmission mode, additional control information on further retransmission protocol related parameters or options can be communicated.

TABLE 14

| Code point | NDI 1 | NDI 2 | RV 1 | RV 2 | Re-transmission mode | ACK/NACK transmission scheme |
|---|---|---|---|---|---|---|
| 0 | 0 | 0 | 0 | 0 | Mode 1 | ACK/NACK multicode scheme |
| 1 | 0 | 0 | 0 | 1 | | |
| 2 | 0 | 1 | 1 | 2 | | |
| ... | ... | ... | ... | ... | | |
| ... | ... | ... | ... | ... | | |
| 28 | 1 | 0 | 0 | 0 | | ACK/NACK multiplexing scheme |
| 29 | 1 | 1 | 0 | 0 | | |
| 30 | 0 | 0 | 2 | 2 | | |
| ... | ... | ... | ... | ... | | |
| 35 | 1 | 1 | 2 | 2 | | ACK/NACK multichannel scheme |
| ... | ... | ... | ... | ... | | |
| 58 | 0 | 1 | 3 | 1 | | |
| 59 | 0 | 0 | 3 | 1 | | |
| 60 | 0 | 0 | 0 | 0 | Mode 2 | ACK/NACK bundling scheme |
| 61 | 0 | 0 | 2 | 2 | | |
| 62 | 1 | 1 | 0 | 0 | | |
| 63 | 1 | 1 | 2 | 2 | | |

Alternatively, if for example the retransmission mode is the acknowledgement scheme for the HARQ feedback is implicit to the acknowledgment transmission scheme (ACK/NACK transmission scheme), it is also be possible that retransmission mode is not explicitly indicated and only the ACK/NACK transmission scheme is indicated as exemplified in Table 15 below. Of course, It is also possible that more or less than the four transmission schemes indicated in Table 15 exist,

TABLE 15

| Code-point | NDI 1 | NDI 2 | RV 1 | RV 2 | ACK/NACK transmission scheme |
|---|---|---|---|---|---|
| 0 | 0 | 0 | 0 | 0 | ACK/NACK multicode scheme |
| 1 | 0 | 0 | 0 | 1 | |
| 2 | 0 | 1 | 1 | 2 | |
| ... | ... | ... | ... | ... | |
| ... | ... | ... | ... | ... | |
| 28 | 1 | 0 | 0 | 0 | ACK/NACK multiplexing scheme |
| 29 | 1 | 1 | 0 | 0 | |
| 30 | 0 | 0 | 2 | 2 | |
| ... | ... | ... | ... | ... | |
| 35 | 1 | 1 | 2 | 2 | ACK/NACK multichannel scheme |
| ... | ... | ... | ... | ... | |
| 58 | 0 | 1 | 3 | 1 | |
| 59 | 0 | 0 | 3 | 1 | |
| 60 | 0 | 0 | 0 | 0 | ACK/NACK bundling scheme |
| 61 | 0 | 0 | 2 | 2 | |
| 62 | 1 | 1 | 0 | 0 | |
| 63 | 1 | 1 | 2 | 2 | |

Generally, in the examples given with respect to Table 14 and Table 15, there are no duplicated NDI-RV combinations for codepoints 0 to 59. However, it is also possible that some codepoints in this range indicate the same NDI-RV combination—this would essentially correspond to dividing the available set of codepoints into four subsets (instead of two subsets and adding a further subdivision of the first subsets as in the example given with respect to Table 14).

In another exemplary embodiment of the invention, the retransmission mode field in the control message may used to not only indicate the retransmission mode for the retransmission protocol but also the whether the physical channel resource(s) for the retransmission protocol feedback are located on a single or multiple component carrier.

Figure 11:
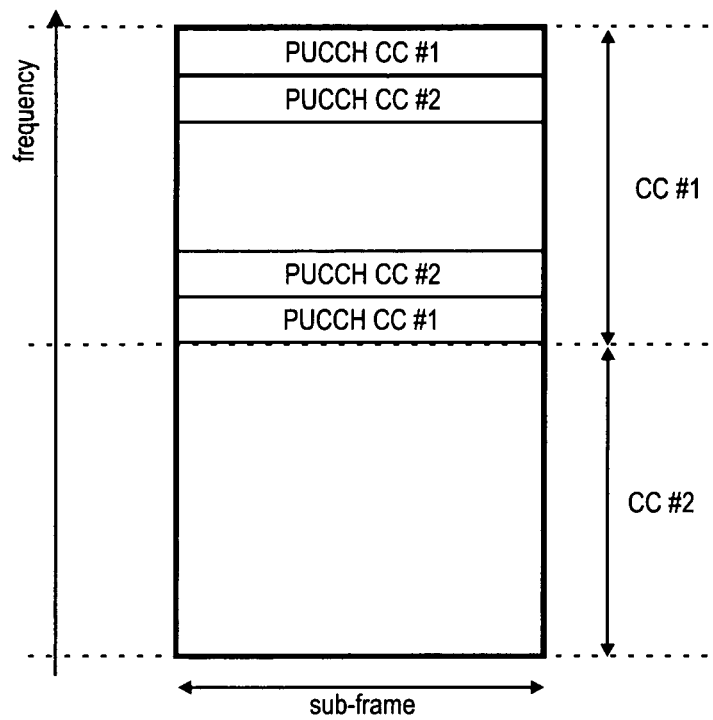
FIG. 11 shows an exemplary assignment of PUCCH resources on a single component carrier and FIG. 12 shows an exemplary assignment of PUCCH resources on multiple component carriers.
Figure 12:
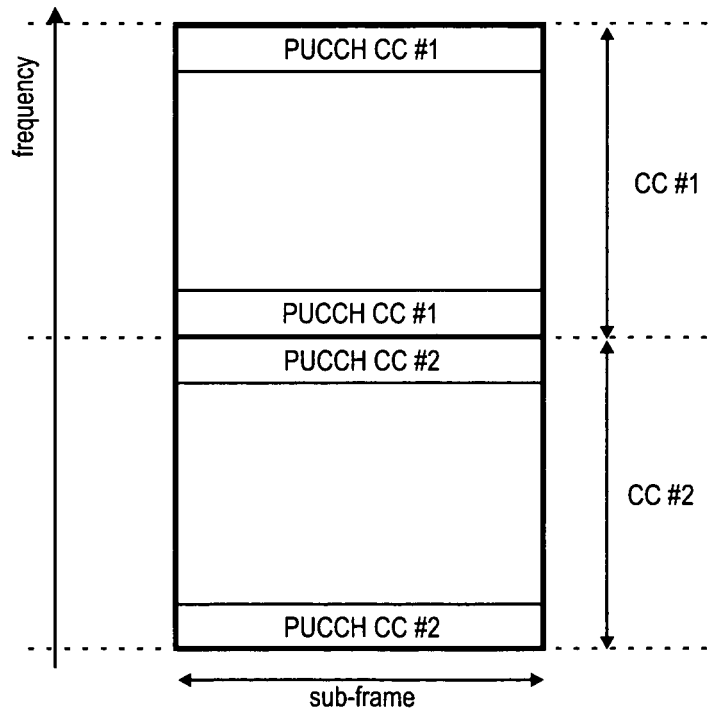

For example, the location of the physical channel resource(s) for HARQ feedback on the Physical Uplink Control Channel (PUCCH) could be indicated in addition to the retransmission mode. In case of uplink carrier aggregation, the UE might have more than one resource block assigned on the PUCCH. It might be possible that all PUCCH resource blocks are within single uplink component carrier, as shown in FIG. 11 or the assigned resource blocks of the PUCCH are located within multiple uplink component carriers as shown in FIG. 12. Note that FIG. 11 and FIG. 12 are from a single UE perspective and there might be more PUCCH regions assigned for feedback provision of other UEs.

Table 16 illustrates an example, where for each retransmission mode, the retransmission mode field is used to additionally indicate the PUCCH regions for UE. Note that in case of PUCCH regions on single uplink component carrier, it is also possible to indicate in which uplink component carrier the PUCCH regions are present. This feature is however optional.

TABLE 16

| Code-point | NDI 1 | NDI 2 | RV 1 | RV 2 | Retransmission mode | PUCCH regions |
|---|---|---|---|---|---|---|
| 0 | 0 | 0 | 0 | 0 | Mode 1 | PUCCH regions confined to single uplink component carrier #1 |
| 1 | 0 | 0 | 0 | 1 | | |
| 2 | 0 | 1 | 1 | 2 | | |
| ... | ... | ... | ... | ... | | PUCCH regions confined to single uplink component carrier #2 |
| ... | ... | ... | ... | ... | | |
| 28 | 1 | 0 | 0 | 0 | | |
| 29 | 1 | 1 | 0 | 0 | | |
| 30 | 0 | 0 | 2 | 2 | | |
| ... | ... | ... | ... | ... | | PUCCH regions on multiple uplink component carriers |
| 35 | 1 | 1 | 2 | 2 | | |
| ... | ... | ... | ... | ... | | |
| 58 | 0 | 1 | 3 | 1 | | |
| 59 | 0 | 0 | 3 | 1 | | |
| 60 | 0 | 0 | 0 | 0 | Mode 2 | PUCCH regions confined to single uplink component carrier |
| 61 | 0 | 0 | 2 | 2 | | |
| 62 | 1 | 1 | 0 | 0 | | PUCCH regions on multiple uplink component carriers |
| 63 | 1 | 1 | 2 | 2 | | |

In a further exemplary embodiment of the invention, the retransmission mode field in the control message could for example further indicate coordinated multipoint related information. Coordinated multipoint related information could be for example indication of set of Node Bs or relay nodes or any other radio resource equipments which UE should use for measurement, reporting of measurement information and transmission/reception of control message/data, Table 18 below shows an example where the codepoints indicate the retransmission mode and in addition a set of Node Bs for which UE could measure and send the reporting message (e.g. channel quality reports).

TABLE 17

| Code-point | NDI 1 | NDI 2 | RV 1 | RV 2 | Re-transmission mode | Measurement or Reporting nodes |
|---|---|---|---|---|---|---|
| 0 | 0 | 0 | 0 | 0 | Mode 1 | Set of nodes A (e.g. Node B 1, Node B 2) |
| 1 | 0 | 0 | 0 | 1 | | |
| 2 | 0 | 1 | 1 | 2 | | |
| ... | ... | ... | ... | ... | | |
| ... | ... | ... | ... | ... | | |
| 28 | 1 | 0 | 0 | 0 | | |
| 29 | 1 | 1 | 0 | 0 | | |
| 30 | 0 | 0 | 2 | 2 | | |
| ... | ... | ... | ... | ... | | |
| 35 | 1 | 1 | 2 | 2 | | |
| ... | ... | ... | ... | ... | | |
| 58 | 0 | 1 | 3 | 1 | | |
| 59 | 0 | 0 | 3 | 1 | | |
| 60 | 0 | 0 | 0 | 0 | Mode 2 | Set of nodes B (e.g. NodeB 1, Node B 3) |
| 61 | 0 | 0 | 2 | 2 | | |
| 62 | 1 | 1 | 0 | 0 | | |
| 63 | 1 | 1 | 2 | 2 | | |

In another exemplary embodiment of the invention, the retransmission mode field may be further used to indicate relay node related control information. For example, relay node related control information is assumed to indicate the network node to which the UE is assumed to transmit the uplink acknowledgement signal for the downlink data transmissions. Hence, if UE is connected to a Node B and relay node (RN), and receives a downlink data transmissions from both Node B and relay node, the retransmission mode field could be used to indicate to the UE which node the retransmission protocol feedback should be sent to. An example is shown in Table 18.

TABLE 18

| Code-point | NDI 1 | NDI 2 | RV 1 | RV 2 | Retransmission mode | Acknowledgement nodes |
|---|---|---|---|---|---|---|
| 0 | 0 | 0 | 0 | 0 | Mode 1 | Acknowledgement to Node B |
| 1 | 0 | 0 | 0 | 1 | | |
| 2 | 0 | 1 | 1 | 2 | | |
| ... | ... | ... | ... | ... | | |
| ... | ... | ... | ... | ... | | |
| 28 | 1 | 0 | 0 | 0 | | |
| 29 | 1 | 1 | 0 | 0 | | |
| 30 | 0 | 0 | 2 | 2 | | |
| ... | ... | ... | ... | ... | | |
| 35 | 1 | 1 | 2 | 2 | | |
| ... | ... | ... | ... | ... | | |
| 58 | 0 | 1 | 3 | 1 | | |
| 59 | 0 | 0 | 3 | 1 | | |
| 60 | 0 | 0 | 0 | 0 | Mode 2 | Acknowledgement to relay node |
| 61 | 0 | 0 | 2 | 2 | | |
| 62 | 1 | 1 | 0 | 0 | | |
| 63 | 1 | 1 | 2 | 2 | | |

Note that the description above has mainly focused on transmissions of two transport blocks on different component carriers within a sub-frame with non-spatial multiplexing. However it is applicable for multiple transport blocks on more than two component carriers for both FDD and TDD systems.

Another embodiment of the invention relates to the implementation of the above described various embodiments using hardware and software. It is recognized that the various embodiments of the invention may be implemented or performed using computing devices (processors) that are suitably controlled by executable instructions that cause the computing device to perform the functions according to the different embodiments of the invention described herein. A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer-readable storage media, for example RAM, EPROM, EEPROM, flash memory, registers, hard disks, CD-ROM, DVD, etc.

Most of the embodiments have been outlined in relation to a 3GPP-based architecture of a communication system and the terminology used in the previous sections mainly relates to the 3GPP terminology. However, the terminology and the description of the various embodiments with respect to 3GPP-based architectures are not intended to limit the principles and ideas of the inventions to such systems only.

Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the improvements proposed herein may be readily applied in the architectures described in the Technical Background section. Furthermore, the concept of the invention may be also readily used in the LTE-A RAN currently discussed by the 3GPP.

In the previous paragraphs various embodiments of the invention and variations thereof have been described. It would be appreciated by a person skilled in the art that numerous variations and/or modifications may be made to the present invention as shown in the specific embodiments without departing from the spirit or scope of the invention as broadly described.

The invention claimed is:

1. A method for determining a retransmission mode of a retransmission protocol for data transmissions provided to a communication terminal, the method comprising the steps of:
receiving a control message related to a plurality data transmissions, wherein the control message comprises a field indicating one of a plurality of codepoints,
wherein the plurality of codepoints is divided into at least two subsets, each subset of codepoints indicating a respective value of a retransmission mode for the plurality of data transmissions indicated by the control message, a first value of the retransmission mode indicating an acknowledgement bundling mode and a second value of the retransmission mode indicating an acknowledgement non-bundling mode, and
determining whether the retransmission mode is either the acknowledgement bundling mode or the acknowledgement non-bundling mode based on the received one of the plurality of codepoints signalled in said field of the control message.

2. The method according to claim 1, wherein the plurality of codepoints that can be signalled in said field of the control message indicate retransmission protocol related information for the data transmissions.

3. The method according to claim 2, wherein the retransmission protocol related information is an indication of a redundancy version and a new data indicator for each data transmission.

4. The method according to claim 2, wherein each codepoint is consisting of a number of N bits, and
wherein each of the subsets of codepoints is indicating a number of combinations of redundancy versions and new data indicators for the data transmissions that is lower than a maximum number of combinations of redundancy versions and new data indicators for of the data transmissions representable by N bits.

5. The method according to claim 4, wherein a respective subset i can represent $N_i$ different codepoints, and wherein the $N_i$ different codepoints are the $N_i$ most probable or important combinations of redundancy versions and new data indicators for the plurality of data transmissions.

6. The method according to claim 4, wherein the combinations of redundancy versions and new data indicators for the plurality of data transmissions representable by the respective subsets of codepoints have at least one code point that indicates combinations of redundancy versions and new data indicators.

7. The method according to claim 1, wherein the plurality of codepoints that can be signalled in said field of the control message indicate retransmission protocol related and resource allocation related information of the data transmissions.

8. The method according to claim 1, wherein the plurality of codepoints that can be signalled in said field of the control message further indicate retransmission protocol related information for the data transmissions, and the interpretation of the codepoint signalled in said field of the control message is depending on the retransmission mode indicated by the codepoint.

9. The method according to claim 1, wherein individual bits of the codepoint indicate a joint new data indicator for all data transmissions and a joint redundancy version for all data transmissions, if the codepoint in said field of the control message is indicating the acknowledgment bundling mode and the individual bits of the codepoint indicate a respective new data indicator for each data transmission and a respective redundancy version of for each data transmission, if the codepoint in said field of the control message is indicating the acknowledgment non-bundling mode.

10. The method according to claim 1, wherein the codepoints indicate a value of the retransmission mode comprising one of: a synchronous retransmission mode, in which a synchronous retransmission protocol is used for the data transmissions, and an asynchronous retransmission mode, in which an asynchronous retransmission protocol is used for the data transmissions.

11. The method according to claim 1, wherein the method further comprises the steps of:
receiving the data transmissions within a single sub-frame of a physical data channel, and
acknowledging the reception of the data transmissions with a bundled acknowledgement when the determined acknowledgement mode is the acknowledgment bundling mode and with non-bundled acknowledgements when the determined acknowledgement mode is the acknowledgement non-bundling mode.

12. The method according to claim 1, wherein the control message is L1/L2 control information transmitted via a Physical Downlink Control Channel.

13. The method according to claim 1, wherein the plurality data transmissions are transmitted in a sub-frame via respective component carriers in a system using carrier aggregation or Multiple Input Multiple Output layers on an air interface.

14. The method according to claim 13, wherein the control message comprises a resource allocation for allocating respective physical channel resources on a Physical Downlink Shared Channel for the data transmissions on the component carriers.

15. A non-transitory computer-readable medium storing instructions that, when executed by a processor of a communication terminal, causes the communication terminal to execute the steps of a method according to claim 1.

16. A communication terminal for use in a mobile communication system, the communication terminal comprising:

a receiver for receiving a control message related to a plurality data transmissions, wherein the control message comprises a field indicating one of a plurality of codepoints, wherein the plurality of codepoints is divided into at least two subsets, each subset of codepoints indicating a respective value of a retransmission mode for the plurality of data transmissions indicated by the control message, a first value of the retransmission mode indicating an acknowledgement bundling mode and a second value of the retransmission mode indicating an acknowledgement non-bundling mode and
wherein the receiver is configured to receive said data transmissions using a retransmission protocol, and
a processing unit for determining whether the retransmission mode is either the acknowledgement bundling mode or the acknowledgement non-bundling mode based on the received one of the plurality of codepoints signalled in said field of the control message.

17. The communication terminal according to claim 16, further comprising a transmitter for acknowledging the data transmissions according to the retransmission mode indicated by the control message.

18. A base station for use in a mobile communication system, the base station comprising:
a processing unit for generating a control message, the control message comprising a field indicating one of a plurality of codepoints, wherein the plurality of codepoints is divided into at least two subsets, each subset of codepoints indicating a respective value of a retransmission mode for a plurality of data transmissions indicated by the control message, a first value of the retransmission mode indicating an acknowledgement bundling mode and a second value of the retransmission mode indicating an acknowledgement non-bundling mode, wherein the processing unit detennines whether the retransmission mode is either the acknowledgement bundling mode or the acknowledgement non-bundling mode based on the received one of the plurality of codepoints signalled in said field of the control message; and
a transmitter for transmitting the control message using a retransmission protocol and for transmitting said plurality data transmissions to a communication terminal.

19. The base station according to claim 18, further comprising a receiver for receiving an acknowledgement of the data transmissions from the communication according to the retransmission mode indicated in the control message.

* * * * *